(12) United States Patent
Kassow et al.

(10) Patent No.: US 9,523,446 B2
(45) Date of Patent: Dec. 20, 2016

(54) UNBONDED FLEXIBLE PIPE

(75) Inventors: Kristian Kassow, Copenhagen S (DK); Kristian Glejbøl, Glostrup (DK)

(73) Assignee: NATIONAL OILWELL VARCO DENMARK I/S, Brondby (DK)

( * ) Notice: Subject to any disclaimer, the term of this patent is extended or adjusted under 35 U.S.C. 154(b) by 363 days.

(21) Appl. No.: 13/978,181

(22) PCT Filed: Jan. 3, 2012

(86) PCT No.: PCT/DK2012/050002
§ 371 (c)(1),
(2), (4) Date: Sep. 5, 2013

(87) PCT Pub. No.: WO2012/092931
PCT Pub. Date: Jul. 12, 2012

(65) Prior Publication Data
US 2013/0340877 A1    Dec. 26, 2013

(30) Foreign Application Priority Data
Jan. 6, 2011    (DK) .................. 2011 00010

(51) Int. Cl.
*F16L 55/00*    (2006.01)
*F16L 11/20*    (2006.01)
(Continued)

(52) U.S. Cl.
CPC .............. *F16L 11/20* (2013.01); *F16L 11/083* (2013.01); *F16L 11/12* (2013.01); *F16L 11/22* (2013.01); *F16L 33/01* (2013.01)

(58) Field of Classification Search
USPC ........................................ 138/104, 135, 130
See application file for complete search history.

(56) References Cited

U.S. PATENT DOCUMENTS 4,194,536 A * 3/1980 Stine et al. .................. 138/149
4,336,415 A * 6/1982 Walling .......................... 174/47
(Continued)

FOREIGN PATENT DOCUMENTS

EP    1119684 A1    8/2001
JP    2000-291844 A    10/2000
(Continued)

OTHER PUBLICATIONS

"Recommended Practice for Flexible Pipe", API 17 B, second Edition, Jul. 1998.
Danish Search Report for PA 2011 00010 dated Aug. 19, 2011.

*Primary Examiner* — James Hook
(74) *Attorney, Agent, or Firm* — Pearne & Gordon LLP

(57) ABSTRACT

The invention relates to an unbonded flexible pipe for subsea transportation of fluids. The pipe has a length and comprises a tubular inner sealing sheath defining a bore and an axis of the pipe. In a pipe length section it comprises a second sealing sheath surrounding the inner sealing sheath and forming an annulus between the inner sealing sheath and the second sealing sheath. The annulus provides a primary maintaining passage along the length of the pipe length section with a first and a second end. The pipe comprises at least one secondary maintaining passage along the length of the pipe with a first and a second end. The secondary maintaining passage is arranged with an axial distance which is larger than the axial distance of the inner sealing sheath.

44 Claims, 7 Drawing Sheets

(51) Int. Cl.
*F16L 11/08* (2006.01)
*F16L 11/12* (2006.01)
*F16L 11/22* (2006.01)
*F16L 33/01* (2006.01)

(56) References Cited

U.S. PATENT DOCUMENTS

| | | | | |
|---|---|---|---|---|
| 6,039,083 | A * | 3/2000 | Loper | 138/135 |
| 6,085,799 | A | 7/2000 | Kodaissi | |
| 6,123,114 | A | 9/2000 | Seguin | |
| 6,634,387 | B1 * | 10/2003 | Glejbol | 138/104 |
| 8,839,822 | B2 * | 9/2014 | Quigley et al. | 138/115 |
| 2003/0056845 | A1 | 3/2003 | Fraser | |
| 2004/0256019 | A1 | 12/2004 | Marion | |
| 2005/0155663 | A1 * | 7/2005 | Dhellemmes et al. | 138/149 |
| 2008/0149209 | A1 | 6/2008 | Felix-Henry | |
| 2008/0264508 | A1 | 10/2008 | Adamson | |
| 2010/0084035 | A1 | 4/2010 | Binet | |
| 2013/0192707 | A1 * | 8/2013 | Graham et al. | 138/109 |
| 2014/0116564 | A1 * | 5/2014 | McNab | 138/137 |

FOREIGN PATENT DOCUMENTS

| | | |
|---|---|---|
| WO | 00/17479 A1 | 3/2000 |
| WO | 01/61232 A1 | 8/2001 |
| WO | 2008/053142 A2 | 5/2008 |
| WO | 2011/083819 A1 | 7/2011 |

* cited by examiner

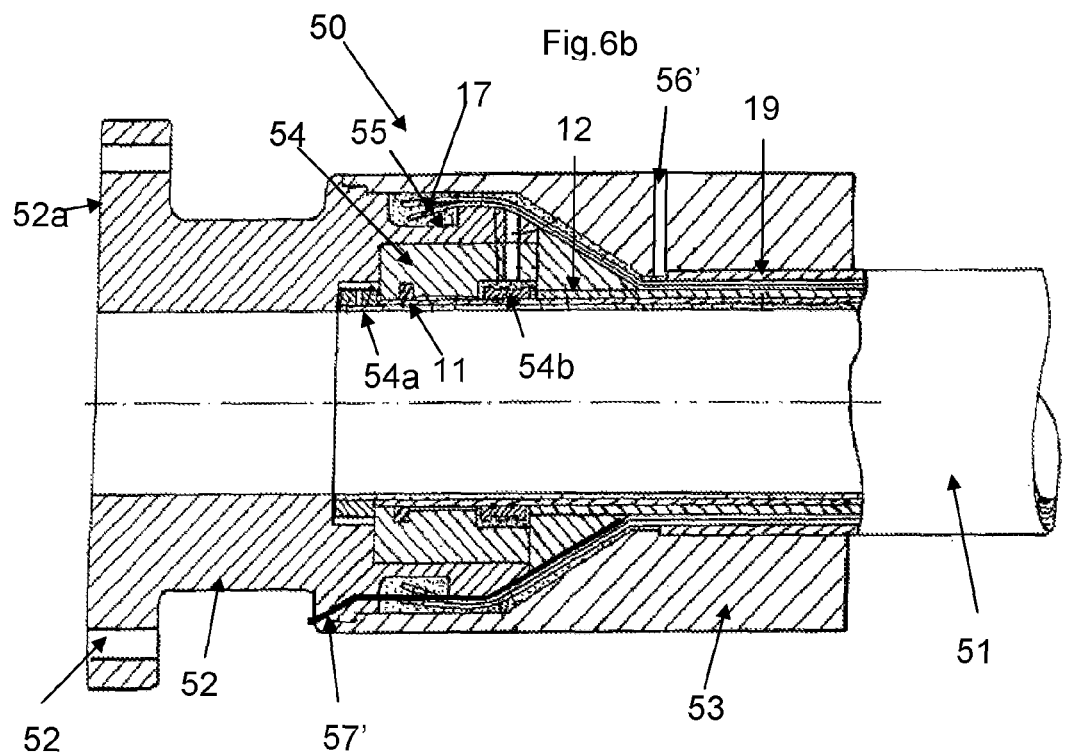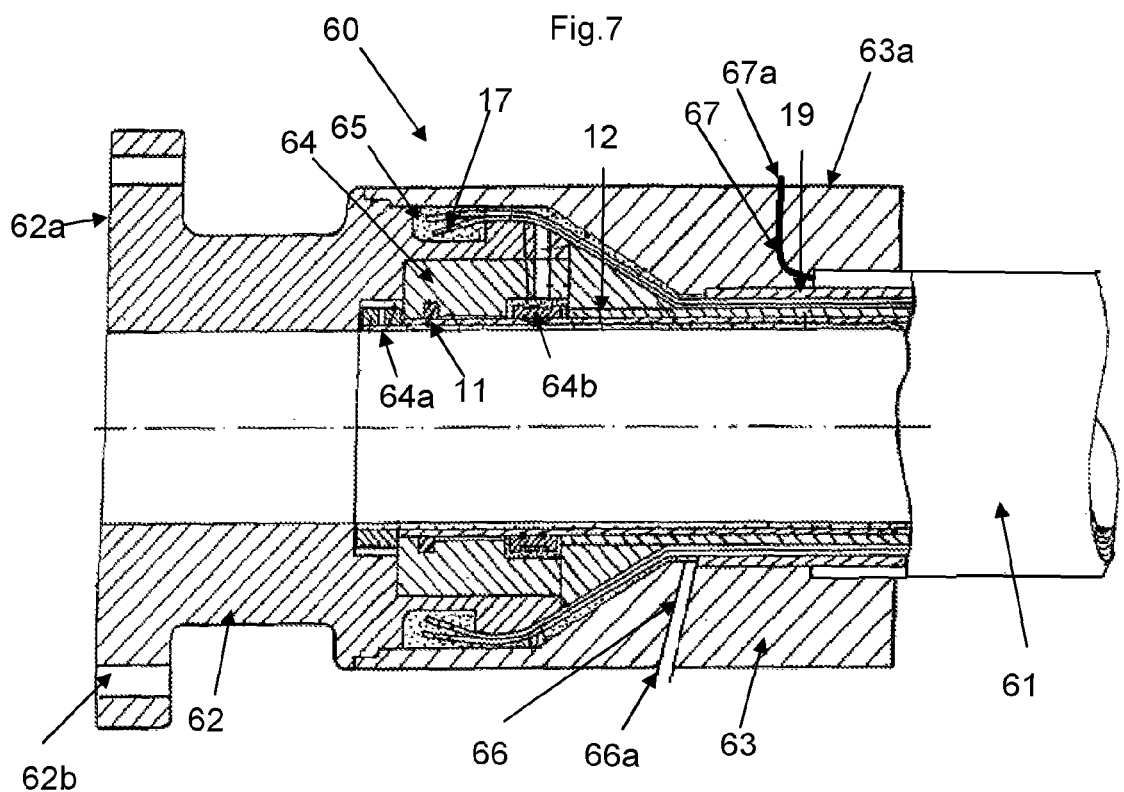

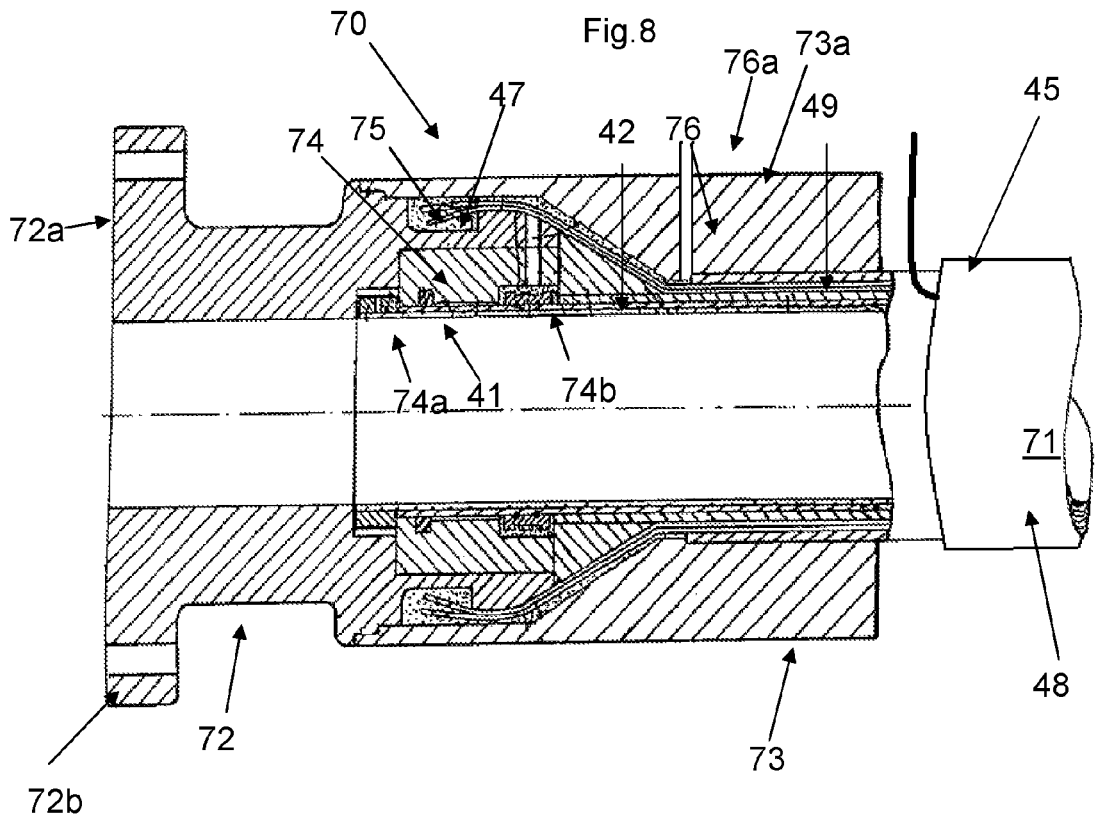
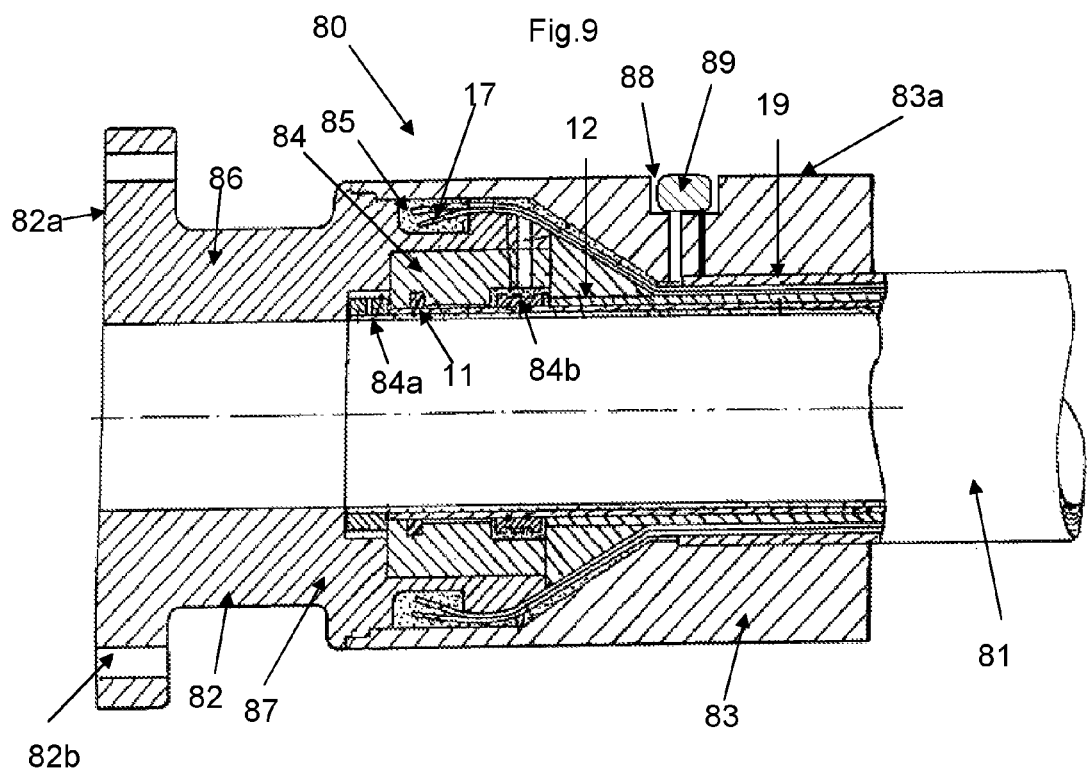

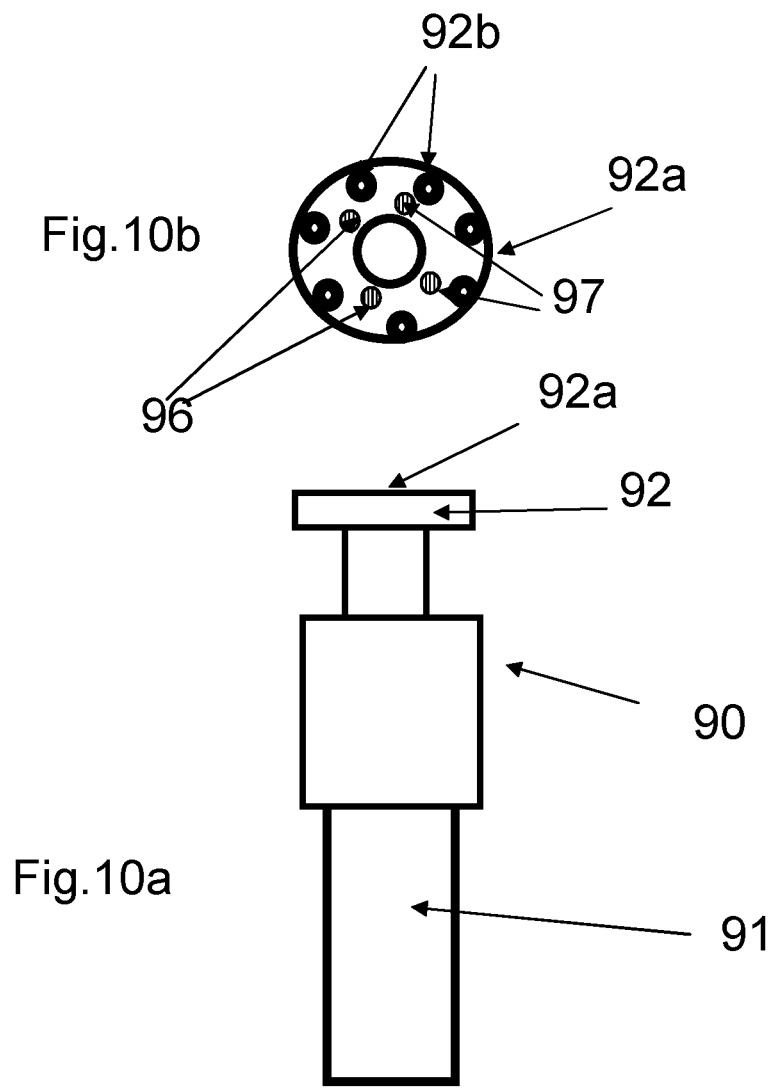

UNBONDED FLEXIBLE PIPE

TECHNICAL FIELD

The invention relates to a flexible pipe for transportation of fluids in offshore applications and in particular for transportation of gas containing fluids such as hydrocarbons.

BACKGROUND ART

Flexible pipes of the present type for offshore transportation of fluids are well known in the art and are for example described in "Recommended Practice for Flexible Pipe", API 17 B, second Edition, 1998, which provides a standard for such pipes. Such pipes usually comprise an inner liner also often called an inner sealing sheath or an inner sheath, which forms a barrier against the outflow of the fluid which is conveyed through the pipe, and one or more armouring layers on the outer side of the inner liner (outer armouring layer(s)). An outer sealing sheath may be provided with the object of forming a barrier against the ingress of fluids from the pipe surroundings to the armour layers.

Typical unbonded flexible pipes are e.g. disclosed in WO0161232A1, U.S. Pat. No. 6,123,114 and U.S. Pat. No. 6,085,799.

The term "unbonded" means in this text that at least two of the layers including the armouring layers and polymer layers are not bonded to each other. In practice the known pipe normally comprises at least two armouring layers located outside the inner sealing sheath. These armouring layers are not bonded to each other directly or indirectly via other layers along the pipe. Thereby the pipe becomes bendable and sufficiently flexible to roll up for transportation.

During use of a flexible pipe for transportation of hydrocarbon containing and/or water containing fluids, gasses such a $CO_2$, $H_2S$ and $H_2O$ will often migrate through the inner sealing sheath and into an annular space, also called an annulus, outside the inner sealing sheath provided by the inner sealing sheath and an additional sealing sheath surrounding the inner sealing sheath such as an outer sealing sheath. Over time the pressure in such annulus may become quite considerable, and in order to prevent such pressure from damaging the pipe, different structures have been provided to allow the penetrated gasses to escape from the annulus.

EP 1 119 684 discloses such flexible pipe construction where gasses penetrated from the bore of the pipe into the annulus are conveyed away via the bore by providing a passageway with a bypass valve. WO 2008/053142 describes a flexible pipe comprising a bore, an inner sealing sheath and an annulus outside the inner sealing sheath where the annulus comprises a passage for venting the annulus in order to reduce the risk of damaging of the pipe, where the passage can be provided in a terminating end fitting and be provided with a measuring device for monitoring the pressure or other parameters of the gas.

However, the inventor of the present invention has found the even though the penetrated gas is allowed to escape to avoid overpressure, the penetrated gas has other damaging effects, and the purpose of the present invention is to alleviate such damaging effects.

Accordingly it has been found that even though the penetrated gas is allowed to escape to avoid overpressure, the penetrated gas causes an undesired corrosion of armouring elements provided in the annulus and in general such penetration of gasses has shown to reduce the durability of the pipe.

The present invention provides an unbonded flexible pipe in which corrosion of armouring elements provided in the annulus can be kept at a minimum.

DISCLOSURE OF INVENTION

The flexible pipe of the invention is as defined in the claims and as described in the following.

The unbonded flexible pipe of the invention is in particular suitable for sub sea transportation of fluids, such as hydrocarbons and hydrocarbon liquid and/or gasses. The unbonded flexible pipe of the invention can also be used beneficially for transportation of water and water containing liquids. The unbonded flexible pipe has a length and comprises a tubular inner sealing sheath, which is the innermost sealing sheath forming a barrier against fluids and which defines a bore through which the fluid can be transported. The unbonded flexible pipe has a centre axis, which is the central axis of the bore. Usually the bore will be substantially circular in cross-section, but it may also have other shapes, such as oval. The unbonded flexible pipe comprises at least one pipe length section comprising a second sealing sheath surrounding the inner sealing sheath and forming an annulus between the inner sealing sheath and the second sealing sheath. The annulus provides a primary maintaining passage along the length of the pipe length section with a first and a second end. The annulus is defined as the passage in the length direction of the pipe between the inner sealing sheath and the second sealing sheath, however, often the pipe comprises one or more armouring layers as well as film layer(s) and optionally other elements in the annulus, which means that the annulus is more or less blocked, such that in fact a plurality of small passages is provided between the various layers and elements in the annulus. This plurality of small passages should be interpreted to provide the primary maintaining passage.

The unbonded flexible pipe of the invention further comprises in at least one pipe length section at least one secondary maintaining passage along the length of the pipe. The secondary maintaining passage has a first and a second end and is placed in the flexible unbonded pipe such that it has an axial distance which is larger than the axial distance of the inner sealing sheath. In other words, the secondary maintaining passage is placed at the in radial direction outer side of the inner sealing sheath. It should be understood that the secondary maintaining passage may be in the form of a passage provided in a pipe which is embedded in the inner sealing sheath. Since the strength of the inner sealing sheath is often important, the latter embodiment comprising a pipe embedded in the inner sealing sheath may require that the thickness of the inner sealing sheath is increased compared to what would be the necessary thickness without the pipe embedded in the inner sealing sheath.

In the unbonded flexible pipe of the invention the first end of one of the primary and the secondary maintaining passages is arranged as an input end for a maintaining fluid and the first end of the other of the primary and the secondary maintaining passages is arranged as an outflow end for the maintaining fluid, and the primary and the secondary maintaining passages are in fluidic connection with each other at their second ends to provide a pathway for the maintaining fluid. The maintaining fluid can thereby be fed into the pathway via the input end, pass through the primary and the secondary maintaining passage or the secondary and the primary maintaining passage and leave the pathway via the outflow end.

Due to the construction of the unbonded flexible pipe of the invention comprising the pathway for a maintaining fluid, it is possible in a simple and effective manner to keep the corrosion of elements—such as armouring elements in the annulus—relatively low, and accordingly the duration of the unbonded flexible pipe can thereby be increased. By flushing the pathway with the maintaining fluid continuously or with intervals, any potential corrosion of the armouring elements in the annulus will be reduced or even substantially avoided. Furthermore, the unbonded flexible pipe of the invention is not substantially more complicated or expensive to produce than prior art unbonded flexible pipes without the pathway for the maintaining fluid.

The term "a passage in a length direction of the pipe/pipe length section", means that the passage overall extends along the length direction of the pipe/pipe length section, whereas the specific route of the passage may comprise sub-sections with any directions. In other words, a passage with a specific length along the length direction of the pipe may have a specific route which is much longer than the specific length along the length direction of the pipe.

The term "axial distance" is used herein to mean the perpendicular distance to the axis of the pipe when the pipe is substantially straight.

As mentioned the unbonded flexible pipe is preferably adapted for transportation of hydrocarbon containing fluids and/or water containing fluids. In one embodiment the unbonded flexible pipe is adapted for transportation of hydrocarbon containing fluids, such as crude oil and/or gas.

The secondary maintaining passage may in principle be placed anywhere at the in radial direction outer side of the inner sealing sheath. The term "in radial direction" means a direction from the axis of the pipe and radially outwards.

The secondary maintaining passage should not be placed inside the inner sealing sheath because this may provide a risk of an undesired leak between the bore of the unbonded flexible pipe and the secondary maintaining passage. Usually the pressure within the bore is fairly high and in according to the invention it is preferred to keep any risk of leaks of the bore as low as possible.

In one embodiment the unbonded flexible pipe comprises in at least the pipe length section an outermost sealing sheath, and the secondary maintaining passage is arranged in the outermost sealing sheath and/or inside the outermost sealing sheath.

The outermost sealing sheath protects the pipe against inflow of water when the pipe is submerged in sea water.

The terms "inside" and "outside" a layer of the pipe is used to designate the relative distance to the axis of the pipe, such that inside a layer means the area encircled by the layer i.e. with a shorter axial distance than the layer and "outside a layer" means the area not encircled by the layer and not contained by the layer, i.e. with a shorter axial distance than the layer.

The term "inner side" of a layer is the side of the layer facing the axis of the pipe. The term "outer side" of a layer is the side of the layer facing away from the axis of the pipe.

The pipe length section may be the whole length of the unbonded flexible pipe or a part of the whole length of the unbonded flexible pipe, such as for example, about 1% or more, such as about 10% or more, such as about 20% or more, such as about 40% or more such as from about 5% to about the whole length of the unbonded flexible pipe.

In one embodiment a section with a pathway for the maintaining fluid comprises at least a length from one end fitting to another end-fitting and preferably including at least a part of the end-fittings, i.e. the primary and the secondary maintaining passages have first and second ends within the end-fittings.

In situations where the unbonded flexible pipe comprises two or more pipe length sections, these pipe length sections may be interconnected pipe length sections of equal or different structures or these pipe length sections may be integrated pipe length sections with at least one cross sectional variation, such as the thickness of a layer, the presence of an insulation layer or an intermediate polymer layer, the axial distance of the secondary maintaining passage and/or the shape of the secondary maintaining passage.

In one embodiment where the unbonded flexible pipe in at least the pipe length section comprises an outermost sealing sheath, the secondary maintaining passage is arranged at least partly in the outermost sealing sheath. The secondary maintaining passage may for example be placed in a groove provided on the inner side of the outermost sealing sheath, or it may be embedded in the material of the outermost sealing sheath. The unbonded flexible pipe may in one embodiment comprise a plurality of secondary maintaining passages in the outermost sealing sheath. In situations where the secondary maintaining passage(s) is/are arranged at least partly in the outermost sealing sheath, the secondary maintaining passage(s) may be provided as a maintaining pipe with a bore for the maintaining fluid or several maintaining pipes each with a bore and/or it may be in the form of an elongate maintaining cavity or a plurality of elongate maintaining cavities in the outermost sealing sheath along the length of the pipe. The maintaining pipe(s) and/or elongate maintaining cavity (cavities) may for example be helically shaped in order to provide high flexibility of the pipe. In one embodiment the maintaining pipe(s) and/or elongate maintaining cavity (cavities) has/have length direction(s) corresponding to the length direction of the unbonded flexible pipe.

In one embodiment the secondary maintaining passage is arranged at least partly in the annulus. In this embodiment the secondary maintaining passage is preferably provided by a maintaining pipe which is placed in the annulus.

The maintaining pipe in the annulus may preferably be helically wound in order to ensure that the flexibility of the unbonded flexible pipe is not compromised by the maintaining pipe. In one embodiment the unbonded flexible pipe comprises a plurality of maintaining pipes placed in the annulus.

In one embodiment the unbonded flexible pipe at least in the pipe length section comprises at least one armouring layer comprising one or more helically wound armouring elements arranged in the annulus, and the secondary maintaining passage is provided by a maintaining pipe arranged between windings of the one or more helically wound armouring elements.

The unbonded flexible pipe of the invention may for example comprise at least one tensile armouring layer comprising a plurality of helically wound armouring elements arranged in the annulus. In this embodiment the secondary maintaining passage may for example be in the form of a maintaining pipe helically wound adjacent to the plurality of helically wound armouring elements.

The maintaining pipe or maintaining pipes wound adjacent to the plurality of helically wound armouring elements may have an outer shape which is substantially identical to or which corresponds to the outer shape of the helically wound armouring elements. The helically wound armouring elements may in one embodiment have elongate cavities along their length such that a maintaining pipe can be arranged in such cavity or in a cavity provided by the helically wound armouring elements.

In one embodiment the maintaining pipe has a radial thickness substantially identical to a radial thickness of the plurality of helically wound armouring elements.

As mentioned the maintaining pipe has a bore providing the secondary maintaining passage. The bore may in principle have any cross-sectional shape, but in order to provide a large passage/pipe cross-sectional area the bore of the maintaining pipe may in one embodiment have a substantially square shaped cross-sectional shape.

In one embodiment the unbonded flexible pipe in at least the pipe length section comprises an outermost sealing sheath providing the second sealing sheath, the unbonded flexible pipe in at least the pipe length section preferably comprises at least two armouring layers arranged in the annulus, the respective armouring layers optionally are provided by one or more helically wound armouring elements. A film layer e.g. a wound and permeable anti-friction film layer may be provided between the armouring layers.

The one or more maintaining pipes may be placed in any of the armouring layers or partly or totally between armouring layers.

In one embodiment the unbonded flexible pipe in at least the pipe length section comprises a pressure armouring layer in the annulus, and on the outer side of the pressure armouring layer the unbonded flexible pipe comprises at least two tensile armouring layers also in the annulus. The maintaining pipe or pipes is/are preferably placed in the tensile armouring layers, more preferably in the outermost of the tensile armouring layer. This embodiment allows the pressure armouring to be wound with interlocking profiles such that the strength of the pressure armouring layer is substantially homogeneous. Since the tensile armouring mainly is adapted to provide a tensile strength acting along the length direction of the unbonded flexible pipe, the replacement of one or more elongate, tensile, helically wound reinforcement elements with helically wound maintaining pipe, can simply be compensated by making the remaining elongate, tensile, helically wound reinforcement elements slightly stronger—e.g. slightly thicker.

In one embodiment the unbonded flexible pipe in at least the pipe length section comprises an intermediate sealing sheath, which intermediate sealing sheath provides the second sealing sheath. In this embodiment, the pipe in at least the pipe length section may preferably comprise at least one armouring layer arranged in the annulus. The one or more armouring layers may each for example be provided by one or more helically wound armouring elements. The one or more armouring layers in the annulus may e.g. be as described above.

In one embodiment where the unbonded flexible pipe comprises an intermediate sealing sheath, the pipe in at least the pipe length section comprises a pressure armouring layer in the annulus. The pressure armouring layer is preferably provided by one or more helically wound armouring elements, optionally wound with an angle of about 65 degrees or more, preferably about 80 degrees or more, such as at least about 85 degrees or more relative to the axis of the pipe. Such pressure layers are well known in the art and further description about such armouring pressure layer can be found in "Recommended Practice for Flexible Pipe", API 17 B, second Edition, 1998

In one embodiment where the unbonded flexible pipe comprises an intermediate sealing sheath, the pipe in at least the pipe length section comprises a pressure armouring layer and a tensile armour layer in the annulus. The tensile armouring layer is preferably provided by a plurality of helically wound armouring elements, optionally wound with an angle of about 60 degrees or less, preferably about 55 degrees or more, such as about 45 degrees or less relative to the axis of the pipe. Such tensile armouring layers are also well known in the art and are often provided as cross-wound armouring layers. Further description about tensile armouring layers can be found in "Recommended Practice for Flexible Pipe", API 17 B, second Edition, 1998

In one embodiment where the unbonded flexible pipe comprises an intermediate sealing sheath, the pipe in at least the pipe length section further comprises a third sealing sheath surrounding the second sealing sheath, which in this embodiment is the intermediate sealing sheath. The third sealing sheath forms an additional annulus between the second sealing sheath and the third sealing sheath. The third sealing sheath may provide an outermost sealing sheath or further sealing sheath or sealing sheaths may be provided on the outer side of the third sealing sheath.

In one embodiment where the unbonded flexible pipe comprises an additional annulus, the pipe may for example comprise one or more armouring layers in the annulus preferably including at least a pressure armouring layer, and the pipe may comprise zero, one or more armouring layers in the additional annulus.

In one embodiment where the unbonded flexible pipe comprises an additional annulus, the pipe in at least the pipe length section comprises at least one tensile armour layer in the additional annulus. The tensile armouring layer may for example comprise a plurality of helically wound armouring elements, optionally wound with an angle of about 60 degrees or less, preferably about 55 degrees or more, such as about 45 degrees or less relative to the axis of the pipe.

In one embodiment where the unbonded flexible pipe comprises an additional annulus, the additional annulus may beneficially comprise or constitute the secondary maintaining passage. Thereby the pipe of the invention with primary and the secondary maintaining passages can be produced in a very simple manner. Further the pathway may comprise a locking valve placed between the annulus (primary maintaining passage) and the additional annulus (secondary maintaining passage). Thereby the intermediate sealing sheath may provide an additional anti-leak barrier in case the inner sealing sheath or the outermost sealing sheath is damaged so that fluid from the bore of the pipe may flow into the annulus or sea water may flow into the additional annulus. In this situation the locking valve may automatically, semi-automatically or manually turn off the locking valve to thereby block the fluidic connection between the primary maintaining passage and the secondary maintaining passage. After the damaged pipe has been repaired (if possible) the locking valve may be reopened.

In one embodiment the secondary maintaining passage is provided by the additional annulus or a part of the additional annulus.

In one embodiment the secondary maintaining passage is provided by a maintaining pipe arranged in the additional annulus. The secondary maintaining passage may for example be provided by a maintaining pipe arranged between windings of one or more helically wound armouring elements in the additional annulus, e.g. corresponding to the way the maintaining pipe is arranged in the primary maintaining passage as described above.

If for example the unbonded flexible pipe in at least the pipe length section comprises at least one tensile armouring layer comprising a plurality of helically wound armouring elements arranged in the additional annulus, the secondary maintaining passage may be provided by a maintaining pipe helically wound adjacent to the plurality of helically wound armouring elements.

The shape of the maintaining pipe, such as its radial thickness, its outer shape, its cross-sectional shape and the shape of its maintaining bore, may be as described above.

For example the maintaining pipe in the additional annulus in at least the pipe length section may have a radial thickness substantially identical to a radial thickness of the plurality of helically wound armouring elements in the additional annulus.

In one embodiment the unbonded flexible pipe of the invention comprises an insulating layer. The insulating layer may be placed anywhere outside the inner sealing sheath. The preferred positions for an insulating layer are directly on the outer side of and adjacent to the inner sealing sheath, directly on the outer or inner side of and adjacent to an intermediate sealing sheath and/or directly on the outer or inner side of and adjacent to the outermost sealing sheath. The insulating layer may be more or less impermeable to fluids. Often it is desired that the insulating layer is liquid permeable in order to avoid any substantial pressure difference over the insulating layer. The insulating layer may be extruded, folded or wound as it is well known in the art.

Generally an insulating layer will not require providing the pipe with mechanical strength. Therefore the insulating layer provides a suitable host for the secondary maintaining passage.

In one embodiment of the invention the unbonded flexible pipe in at least the pipe length section comprises an insulating layer and the secondary maintaining passage is at least partly embedded in the insulation layer. The secondary maintaining pipe is preferably provided by a maintaining pipe.

The secondary maintaining passage may for example be placed in a groove provided in the insulating layer, or it may be embedded in the material of the insulating layer. The unbonded flexible pipe may in one embodiment comprise a plurality of secondary maintaining passages in the insulating layer. In situations where the secondary maintaining passage (s) is/are arranged at least partly in the insulating layer, the secondary maintaining passage(s) may be provided as a maintaining pipe with a bore for the maintaining fluid or several maintaining pipes each with a bore and/or it may be in the form of a elongate maintaining cavity or a plurality of elongate maintaining cavities in the insulating layer along the length of the pipe. The maintaining pipe(s) and/or elongate maintaining cavity (cavities) may for example be helically shaped in order to provide high flexibility of the pipe. In one embodiment the maintaining pipe(s) and/or the elongate maintaining cavity (cavities) has/have length direction(s) corresponding to the length direction of the unbonded flexible pipe.

In one embodiment where the insulating layer is an extruded layer, the unbonded flexible pipe in at least the pipe length section comprises the maintaining pipe between the insulating layer and an underlying layer. The extruded insulating layer may preferably conform to the shape of the maintaining pipe to at least partly embed the maintaining pipe. This may be provided by applying the maintaining pipe unto the underlying layer e.g. by helically winding the maintaining pipe, and extruding the insulating layer directly onto the maintaining pipe/underlying layer.

The term "underlying layer" means the layer immediately inside the layer which it is underlying.

In one embodiment where the unbonded flexible pipe in at least the pipe length section comprises an insulating layer in the form of a wound layer, the secondary maintaining passage is at least partly embedded in the insulation layer. In this embodiment the secondary maintaining passage is preferably provided by a maintaining pipe, and the insulating layer is preferably provided from one or more wound elongate insulating elements, such as tapes or profiles of one or more insulating materials. The insulating layer may for example be wound as two sub-layers with the maintaining pipe placed there between.

In one embodiment the unbonded flexible pipe in at least the pipe length section comprises the maintaining pipe between an insulating layer and an underlying layer, the wound elongate insulating elements preferably fully cover the maintaining pipe, to provide a mechanical protection.

In one embodiment where the unbonded flexible pipe in at least the pipe length section comprises the maintaining pipe between an insulating layer and an underlying layer, the underlying layer is selected from an outermost sealing sheath, an armouring layer, an intermediate sealing sheath, and the inner sealing sheath.

In one embodiment the secondary maintaining passage in at least the pipe length section is arranged with an axial distance which is larger than the axial distance of the first maintaining passage.

In one embodiment the pipe in at least the pipe length section comprises an outermost sealing sheath and the secondary maintaining passage is arranged with an axial distance which is larger than the axial distance of the outermost sealing sheath, the secondary maintaining passage is preferably provided by a maintaining pipe. This embodiment has the benefit that the maintaining pipe and thereby the secondary maintaining passage can be added to already manufactured pipes. The fluidic connection between the primary maintaining passage and the secondary maintaining passage can beneficially be provided in an end-fitting.

When the pipe in at least the pipe length section comprises an outermost sealing sheath and the secondary maintaining passage is arranged fully or partly outside the outermost sealing sheath, the material of the maintaining pipe should preferably be selected to be stable towards sea water.

When the secondary maintaining passage in at least the pipe length section is arranged fully or partly in a layer or between layers, optionally partly embedded, of the pipe, the secondary maintaining passage is at least partly protected against mechanical impact.

The unbonded flexible pipe may comprise two or more secondary maintaining passages optionally provided by maintaining pipes.

In one embodiment where the secondary maintaining passage in at least the pipe length section of the pipe is provided by a maintaining pipe and at least a length of the maintaining pipe is located outside an outermost layer of the pipe, the length of the maintaining pipe located outside the outermost layer of the pipe is preferably fixed to the outermost layer of the pipe. Thereby the risk of damaging the part of the maintaining pipe outside the outermost layer of the pipe can be reduced. The fixing may be provided by one or more clamps along the length of the pipe. Alternatively or additionally the maintaining pipe may beneficially be helically wound around the outermost layer of the pipe.

The maintaining pipe may in principle be made of any kind of materials. However, if the maintaining pipe is close to corrosive metals, the material(s) of the maintaining pipe should be selected with a view to avoiding or minimizing galvanic corrosion.

Examples of materials which the maintaining pipe may comprise or consist of, comprise one or more metals, such an aluminium and steel; polymers, such as polyolefins, e.g. polyethylene or poly propylene; polyamide, e.g. poly amide-imide, polyamide-11 (PA-11), polyamide-12 (PA-12) or polyamide-6 (PA-6)); polyimide (PI); polyurethanes; polyureas; polyesters; polyacetals; polyethers, e.g. polyether sulphone (PES); polyoxides; polysulfides, e.g. polyphenylene sulphide (PPS); polysulphones, e.g. polyarylsulphone (PAS); polyacrylates; polyethylene terephthalate (PET); polyether-ether-ketones (PEEK); polyvinyls; polyacrylonitrils; polyetherketoneketone (PEKK); copolymers of the preceding; fluorous polymers e.g. polyvinylidene diflouride (PVDF), homopolymers or copolymers of vinylidene fluoride ("VF2"), homopolymers or copolymers of trifluoroethylene ("VF3"), copolymers or terpolymers comprising two or more different members selected from VF2, VF3, chlorotrifluoroethylene, tetrafluoroethylene, hexafluoropropene, or hexafluoroethylene; compounds comprising one or more of the above mentioned polymers, and composite materials, such as a polymer (e.g. one of the above mentioned) compounded with reinforcement fibres, such as glass-fibers, carbon-fibers and/or aramide fibres; and combinations of metal and polymer.

Examples on metallic materials which can be used for the maintaining pipe include steel, such as: Carbon steel, Carbon-Manganese steel, Carbon-manganese steel with substantially same carbon content as armouring steel wires when maintaining pipe is applied in contact with armouring steel wires, Stainless steels, such as:

Austenitic stainless steel, e.g. AISI 304 (EN 1.4301) or AISI 316 (EN 1.4401);

Duplex stainless steel, e.g. Duplex 2101 (EN 4162), Duplex 2205 (EN 1.4462), Duplex 2507 (EN 1.4410) or Duplex 3207 (EN–);

High-alloy austenitic stainless steels and nickel alloys, e.g.: AISI 904L (EN 1.4539), 254SMO (EN 1.4547), AL6XN (N08367), Alloy 525, Alloy 600, Alloy 800 or Alloy 825;

Ferritic stainless steels;

Martensitic stainless steels e.g. Chrome 13 stainless steel or Titanium or titanium alloys.

The maintaining pipe may be coated e.g. by a polymer to protect against galvanic corrosion.

The optimal size and cross-sectional area of the secondary maintaining passage depend on the number of secondary maintaining passages, the length of the pipe length section, the fluid to be transported and the diffusion barrier properties of the sealing sheaths and in particular of the inner sealing sheath. The secondary maintaining passage may be substantially identical along the length of the pipe length section or it may vary.

In one embodiment the secondary maintaining passage varies along the length of the pipe length section, for example such that the size and/or the radial distance of the secondary maintaining passage varies along the length of the pipe length section.

In one embodiment the secondary maintaining passage has a cross-sectional area of at least about 3 mm$^2$, such as at least about 5 mm$^2$, such as at least about 7 mm$^2$, such as at least about 10 mm$^2$, such as at least about 15 mm$^2$, such as at least about 20 mm$^2$, such as at least about 25 mm$^2$, such as at least about 30 mm$^2$, such as at least about 35 mm$^2$, such as at least about 40 mm$^2$, such as at least about 45 mm$^2$, such as at least about 50 mm$^2$, such as at least about 60 mm$^2$.

In one embodiment the secondary maintaining passage per Km of the pipe length section has a cross-sectional area of at least about 5 mm$^2$, such as at least about 10 mm$^2$, such as at least about 15 mm$^2$, such as at least about 20 mm$^2$, such as at least about 25 mm$^2$, such as at least about 30 mm$^2$, such as at least about 35 mm$^2$, such as at least about 40 mm$^2$, such as at least about 45 mm$^2$, such as at least about 50 mm$^2$, such as at least about 60 mm$^2$.

In one embodiment the secondary maintaining passage has a cross-sectional area between from about 3 mm$^2$ to about 200 mm$^2$, such as from about 10 mm$^2$ to about 100 mm$^2$, such as from about 20 mm$^2$ to about 50 mm$^2$.

In one embodiment the unbonded flexible pipe of the invention comprises at least one end-fitting coupled to and terminating an end of the pipe length section. Preferably the end fitting comprises a primary end-fitting passage in fluidic connection with the primary maintaining passage.

The end-fitting preferably also comprises a secondary end-fitting passage in fluidic connection with the secondary maintaining passage.

In one embodiment the unbonded flexible pipe comprises at least two interconnected pipe length sections each comprising an end-fitting coupled to and terminating an end of said respective pipe length sections, the end-fittings provide at least a part of a connecting assembly interconnecting the pipe length sections, the end fittings each comprise a primary end-fitting passage, and the primary end-fitting passages are in fluidic connection with each other.

Generally it is desired that the connection between the primary and the secondary maintaining passages to provide a pathway for the maintaining fluid, is provided in an end-fitting of the pipe length section. This connection is simple to provide and can be maintained stable and without damaging or reducing the strength of any layers of the pipe.

In one embodiment the primary and the secondary maintaining passages are in fluidic connection with each other, the pipe length section comprises an end-fitting coupled to and terminating an end of said pipe length section, the end fitting comprises a primary end-fitting passage in fluidic connection with the primary maintaining passage, and a secondary end-fitting passage in fluidic connection with the secondary maintaining passage, the fluidic connection between the primary maintaining passage and the secondary maintaining passage is provided in the end-fitting.

In one embodiment the pipe comprises at least two interconnected pipe length sections comprising interconnected primary maintaining passages and interconnected secondary maintaining passages, the primary and the secondary maintaining passages of the interconnected pipe length sections are in fluidic connection with each other, at least one of the pipe length section comprises an end-fitting coupled to and terminating an end of said pipe length section, the end-fitting comprises a primary end-fitting passage in fluidic connection with the interconnected primary maintaining passages, and a secondary end-fitting passage in fluidic connection with the interconnected secondary maintaining passages, the fluidic connection between the primary maintaining passage and the secondary maintaining passage of the pipe length sections is provided in the end-fitting.

The primary and the secondary maintaining passages are in fluidic connection with each other at their second ends to provide a pathway for the maintaining fluid from the input end to the outflow end. This pathway can be provided with one or more valves such as one or more locking valves, one or more one-way valves and/or one or more pressure relief valves.

The pathway for the maintaining liquid may be flushed in any direction.

In one embodiment the first end of the secondary maintaining passage is arranged as the input end for the maintaining fluid and the first end of the primary maintaining passage is arranged as the outflow end, optionally a pump is provided to pump maintaining fluid from the input end, through the pathway and to exit at the outflow end.

In one embodiment the first end of the primary maintaining passage is arranged as the input end for the maintaining fluid and the first end of the secondary maintaining passage is arranged as the outflow end, optionally a pump is provided to pump maintaining fluid from the input end, through the pathway and to exit at the outflow end.

The maintaining fluid may be liquid, gas or mixtures thereof.

In one embodiment the maintaining fluid is or comprises liquid, such as water, water miscible liquid, corrosion inhibiting liquids and/or lubricating liquids.

Examples of liquid maintaining fluids are as follows:
Water mixable liquids such as:
Glycols such as Methyl Ethyl Glycol (MEG)
Methanol
Ethanol
Corrosion inhibiting liquids e.g.:
Methyl Ethyl Glycol (MEG)/Methanol/Ethanol or mixtures of containing active corrosion inhibitor(s)
Oil based fluids
Oil based fluids with active corrosion inhibitor(s)
Lubricating liquids e.g.
Oil based lubricants
Oil based lubricants with additives such as PTFE or graphite In one embodiment the maintaining fluid is gas. Preferably the gas is or comprises a drying gas, such as inert gas e.g. nitrogen (N2) and/or argon (Ag); air and/or methane (CH4).

The maintaining fluid may be recirculated from the outflow end to the input end, preferably after regeneration. The regeneration may for example comprise drying maintaining gas, adjusting the temperature of the maintaining fluid, extracting components from the maintaining fluid and/or adding additive(s) to the maintaining fluid.

The unbonded flexible pipe is preferably a riser. Due to the pressure difference that will normally be in the annulus along the length of a riser pipe in use, the unbonded flexible pipe is particularly beneficial when the pipe is a riser, since the pressure difference in the annulus results in a larger penetration of gasses through the sealing sheaths and in particular through the inner sealing sheath.

In one embodiment at least one of the first ends of one of the primary and the secondary maintaining passages is adapted to be open to be in fluidic communication with the air above sea surface. In one embodiment both of the first ends of the primary and the secondary maintaining passages are adapted to be open to be in fluidic communication with the air above sea surface.

The invention also relates to an offshore installation comprising an unbonded flexible pipe as described above. The unbonded flexible pipe is at least partly installed under water, and preferably the unbonded flexible pipe is a riser.

In one embodiment where the unbonded flexible pipe is a riser, at least a part of the riser extends above water level, preferably at least one of the first end of one of the primary and the secondary maintaining passages is open to the air above water level. In one embodiment both of the first ends of the primary and the secondary maintaining passages are open to the air above water level.

In this embodiment it may be possible to flush the primary and the secondary maintaining passages and thereby the annulus by convection as driving force alone or in combination with a pressure arranged above one or both of the first ends of the primary and the secondary maintaining passages.

The fluid transported in the bore of the pipe is usually much warmer than the seawater in which the unbonded flexible pipe is submerged. If the secondary maintaining passage has a larger radial distance to the axis of the pipe than the pipe length section, the convection forces will drive gasses along the pathway from the first end of the secondary maintaining passage, which therefore provides the input end, to the second end of the secondary maintaining passage, into the second end of the primary maintaining passage and out via the first end of the pipe length section which therefore provides the outflow end. The convection forces are not useful if the maintaining fluid is a liquid, and often the convection flow will not be sufficient even if the maintaining fluid is gas and/or at least the convection forces are not reliable in case of production flow. Therefore it is generally preferred that the offshore installation comprises at least one pump for generating or increasing the flushing of the pathway provided by the primary and the secondary maintaining passages.

In one embodiment offshore installation further comprises a pump for pumping the maintaining fluid. The pump may be an ordinary pump or it may be a pump providing a higher or a lower pressure in a cavity which is in fluid communication with one of the first ends of the primary and the secondary maintaining passages compared to the pressure in fluid communication with the other one of the first ends of the primary and the secondary maintaining passages. The first ends of the primary and the secondary maintaining passages may for example terminate in respective cavities, which cavities are in fluid communication with each other but via a pump and optionally a regeneration unit in between, such that the pressure in one of the cavities is higher than in the other cavity.

In one embodiment the offshore installation further comprises a regeneration unit for regenerating maintaining fluid. Thereby the maintaining fluid may be circulated in a fully or partly closed system. "A fully closed system" means herein that substantially no maintaining fluid is removed or added to the closed system and "partly closed system" means that some, but not all, of the maintaining fluid is replaced, withdrawn and/or fed to the system continuously or with intervals. If the maintaining fluid is a drying gas, the regeneration unit may for example dry the gas.

It has been found that by drying the annulus and keeping the annulus dry, the life time of the unbonded flexible pipe can be surprisingly prolonged and any potential corrosion of metallic elements can be substantially reduced or even avoided.

In one embodiment the regeneration unit regenerates the maintaining fluid with respect to one or more of temperature, pH-value and concentrations of selected components.

In one embodiment the offshore installation further comprises a maintaining fluid supply for supplying fresh maintaining fluid. In one embodiment the offshore installation further comprises a maintaining fluid waist collector.

In one embodiment the offshore installation further comprises one or more measuring unit for determining at least one parameter of the maintaining fluid and/or the pathway, such as pressure, temperature, pH-value, concentrations of selected components, flow velocity, clearance of the pathway and/or leakage of the pathway and thereby the pipe. The measuring unit may for example be provided with an optical fibre sensor arranged on all or part of the pathway.

The offshore installation may further comprises one or more valves to regulate the flow of the maintaining fluid, such as one or more one-way-valves, one or more pressure relief valves, one or more on-off valves and/or one or more time-regulated valves and/or as described above. Valves and use of such valves are well known to the skilled person and based on the teaching herein he will be capable of selecting and incorporating suitable valves and/or valve systems.

The invention further comprises a method of maintaining an unbonded flexible pipe of an offshore installation as described above, where the method comprises maintaining the annulus clean and/or dry by flushing the annulus with a maintaining fluid.

According to the invention the maintaining fluid is flushed in the pathway for the maintaining fluid.

In one embodiment the method of maintaining an unbonded flexible pipe of an offshore comprises feeding the maintaining fluid into the first end of the secondary maintaining passage, which thereby provides the input end, and withdrawing the maintaining fluid or allowing it to flow out via the first end of the primary maintaining passage which thereby provides the outflow end.

In one embodiment the maintaining fluid is fed into the first end of the primary maintaining passage which thereby provides the input end, and the maintaining fluid is withdrawn or allowed to flow out via the first end of the secondary maintaining passage which thereby provides the outflow end.

The maintaining fluid is or comprises liquid, such as water, water miscible liquid, corrosion inhibiting liquids and/or lubricating liquids and/or the maintaining fluid as described above.

The liquid flow provided in the pathway for the maintaining fluid may be a continuous or non-continuous flow. If the maintaining fluid is a gas, it is preferred that the flow is substantially continuous. If the maintaining fluid is a liquid, it is preferred that the flow is a non-continuous flow.

In one embodiment where the maintaining fluid is a liquid maintaining fluid, the liquid flow provided in the pathway for the maintaining fluid has an average flow velocity of at least about 0.1 l/m*day (l per m pipe length section per day), such as at least about 0.2 l/m*day, such as at least about 0.3 l/m*day, such as at least about 0.4 l/m*day, such as at least about 0.5 l/m*day, such as at least about 0.8 l/m*day, such as at least about 1 l/m*day.

In one embodiment where the maintaining fluid is a gas, the maintaining fluid preferably is or comprises a drying gas, such as inert gas e.g. nitrogen (N2) and/or argon (Ag); air and/or methane (CH4).

In one embodiment the gas flow provided in the pathway for the maintaining fluid has an average flow velocity of at least about 0.1 l/m*day (l per m pipe length section per day), such as at least about 0.2 l/m*day, such as at least about 0.3 l/m*day, such as at least about 0.4 l/m*day, such as at least about 0.5 l/m*day, such as at least about 0.8 l/m*day, such as at least about 1 l/m*day. It has been found that the amount of gas in the form of drying gas which is required to flush through the pathway in order to keep the annulus dry is relative low. The optimal amount depends on the drying capacity of the gas, the temperature and pressure in the annulus and the permeability of the sealing sheaths, in particular the inner sealing sheath. The gas may further or alternatively have the function of driving out aggressive gasses from the annulus.

As described above the flow of the maintaining fluid, where the maintaining fluid is gas, may be driven by convection.

However, generally—whether the maintaining fluid is liquid and/or gas it is preferred that the flow is at least partly driven by one or more pumps.

In one embodiment of the method the maintaining fluid is recirculated from the outflow end to the input end, preferably after regeneration e.g. as described. The regeneration optionally comprises drying maintaining gas, adjusting the temperature of the maintaining fluid, extracting components from the maintaining fluid and/or adding additive(s) to the maintaining fluid.

In one embodiment of the method the flow of the maintaining fluid is regulated in dependence of one or more parameters of the maintaining fluid, and/or the pathway. The parameter(s) may be as above and e.g. comprise pressure, temperature, pH-value, concentrations of selected components, flow velocity, clearance of the pathway and/or leakage of the pathway and thereby the pipe.

Further scope of applicability of the present invention will become apparent from the detailed description given hereinafter. However, it should be understood that the description of drawings and examples, while indicating preferred embodiments of the invention, are given by way of illustration only, as various changes and modifications within the spirit and scope of the invention will become apparent to those skilled in the art from this detailed description.

EXAMPLES AND DESCRIPTION OF DRAWINGS

The invention will be explained more fully below in connection with examples and with reference to the drawings.

FIG. 6b is a cross-sectional view of a a variation of the flexible pipe of the invention comprising a first end fitting as shown in FIG. 6a.

FIG. 7 is a cross-sectional view of a flexible pipe of the invention comprising a second end fitting.

FIG. 8 is a cross-sectional view of a flexible pipe of the invention comprising a third end fitting.

FIG. 9 is a cross-sectional view of a flexible pipe of the invention comprising a fourth end fitting.

FIG. 10a is a schematic side view of an end fitting with a mounting flange.

FIG. 10b is a schematic front view of the end fitting of FIG. 10a seen from the side of the mounting flange.

The figures are schematic and simplified for clarity, and they just show details which are essential to the understanding of the invention, while other details are left out. Throughout, the same reference numerals are used for identical or corresponding parts.

Figure 1:
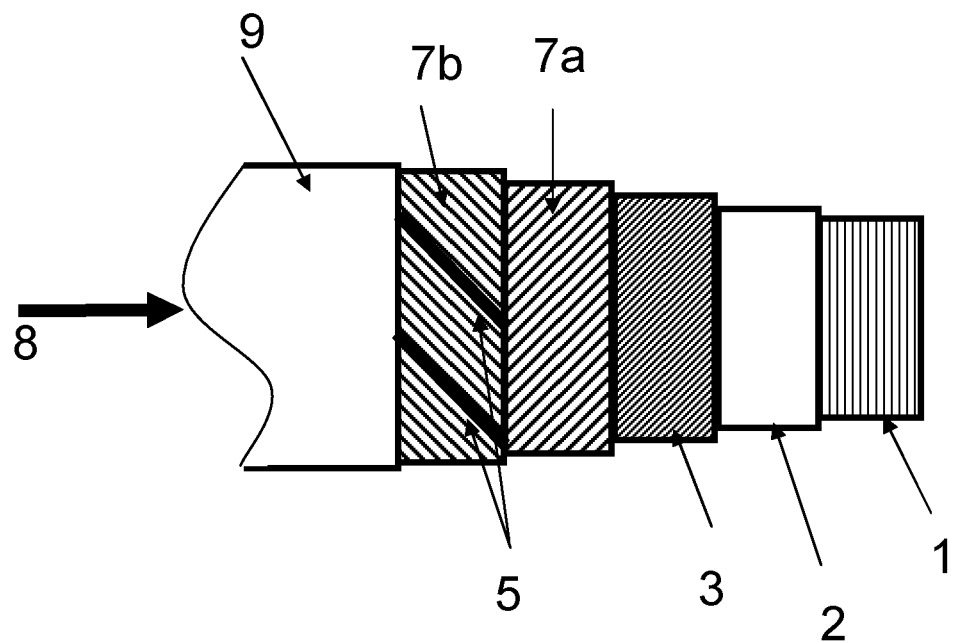
FIG. 1 is a schematic side view of a first flexible pipe of the invention.

The flexible pipe shown in FIG. 1 comprises an inner sealing sheath 2, often also called an inner liner, e.g. of high density poly ethylene (HDPE) cross linked polyethylene (PEX), Polyvinyldifluorid (PVDF) or polyamide (PA). The inner sealing sheath has the purpose of preventing outflow of the fluid transferred in the bore of the pipe, indicated with the arrow 8. In practice the inner sealing sheath will not fully ensure prevention of outflow of the fluid transported, since gasses will permeate through the inner sealing sheath. Inside the inner sealing sheath 2 the pipe comprises an inner armouring layer 1, called a carcass which is normally of metal, and has the main purpose of reinforcing the pipe against collapse. The carcass is not liquid tight. On the outer side of the inner sealing sheath 2, the flexible pipe comprises a pressure armouring layer 3 which is often of helically wound armouring element(s) of metal or composite material, which is wound with an angle to the axis of the pipe of about 65 degrees or more e. about 85 degrees. The pressure armouring layer 3 is not liquid tight.

Outside the pressure armouring layer 3, the pipe comprises two cross wound tensile armouring layers 7a, 7b wound from elongate armoring elements. The elongate armoring elements on the innermost tensile armouring layer 7a is wound with a winding degree of about 55 degrees or less to the axis of the pipe in a first winding direction and the outermost tensile armouring layer 7b is wound with a winding degree of about 60 degrees or less, such as between about 20 and about 55 degrees to the axis of the pipe in a second winding direction which is the opposite direction to the first winding direction. This two armouring layers with such opposite winding direction are normally referred to as being cross wound. The outermost tensile armouring layer 7b comprises a number of maintaining pipes 5 wound adjacent to elongate armoring elements of the outermost tensile armouring layer 7b. The maintaining pipe 5 may be of material(s) and/or shape as described above.

The pipe further comprises an outermost sealing sheath 9 protecting the armouring layer mechanically and against ingress of sea water.

An annulus is formed between the inner sealing sheath 2 and the outermost sealing sheath 9. The pressure armouring layer 3 and the cross wound tensile armouring layers 7a, 7b are arranged within the annulus. None of the armouring layers 1, 3, 7a, 7b are liquid tight. Not shown anti-friction layers may be provided between the armouring layers 3, 7a, 7b in order to increase the flexibility of the pipe. These anti-friction layers are usually in the form of wound polymer film strips. The anti-friction layers are not liquid tight.

Figure 2:
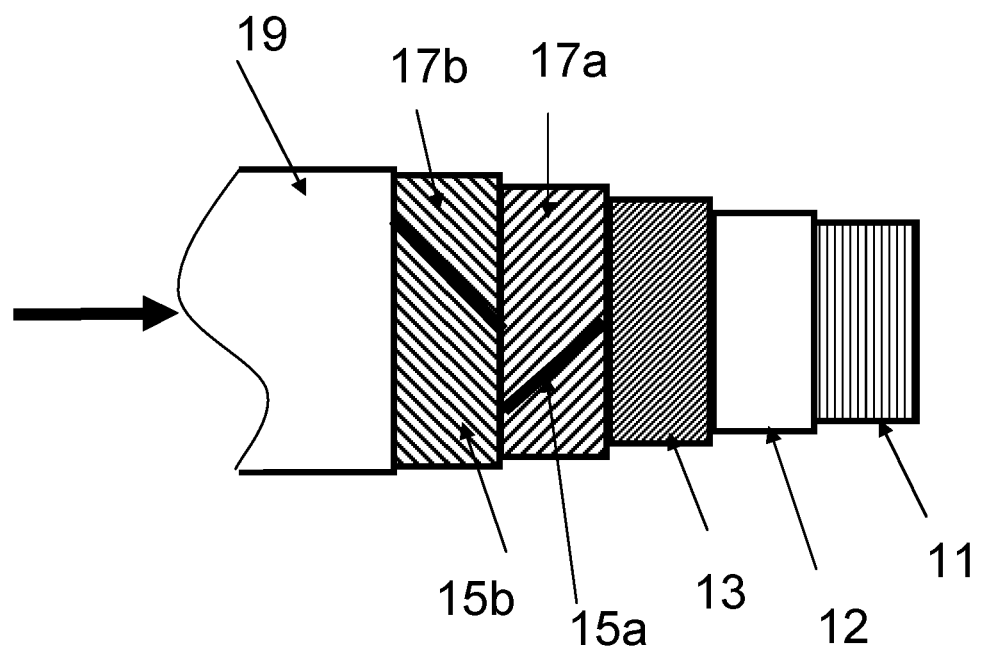
FIG. 2 is a schematic side view of a second flexible pipe of the invention.

The flexible pipe shown in FIG. 2 is a variation of the pipe of FIG. 1 and comprises an inner sealing sheath 12, a carcass 11 on the inner side of the inner sealing sheath 12, a pressure armouring layer 13 on the outer side of the inner sealing sheath 12, a pair of cross wound tensile armouring layers 17a, 17b on the outer side of the pressure armouring layer 13 and an outermost sealing sheath 19 protecting the armouring layer mechanically and against ingress of sea water. Both the innermost and the outermost tensile armouring layers 17a, 17b comprises one or more maintaining pipes 15 wound adjacent to elongate armoring elements of respectively the innermost and the outermost tensile armouring layers 17a, 17b. The maintaining pipe 15 may be of material(s) and/or shape as described above. They may be equal or different from each other.

Figure 3:
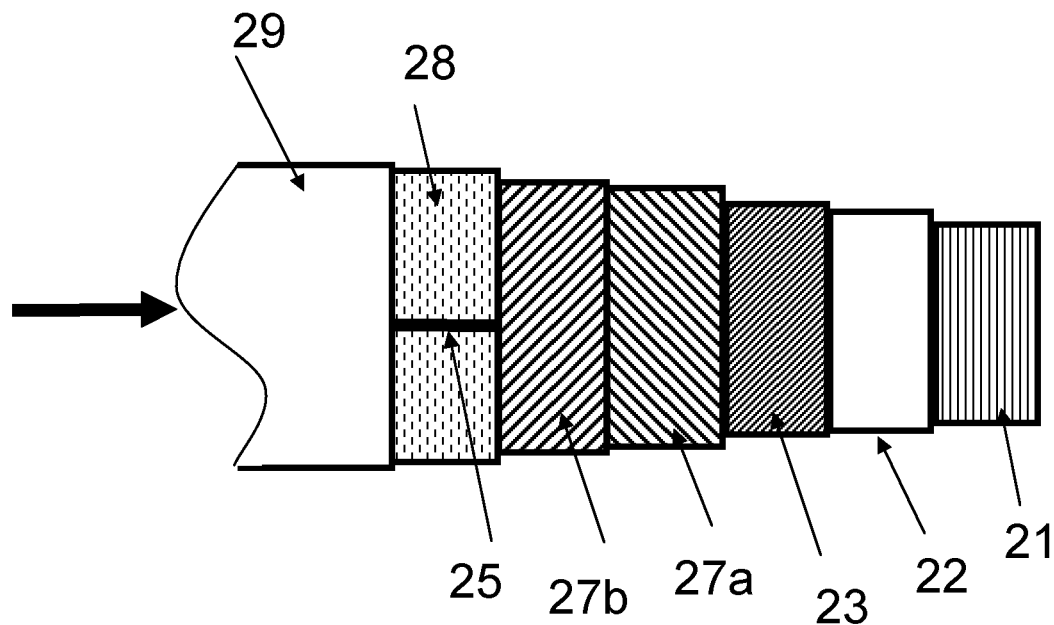
FIG. 3 is a schematic side view of a third flexible pipe of the invention.

The flexible pipe shown in FIG. 3 comprises an inner sealing sheath 22, e.g. of cross linked PE or PA. Normally the inner sealing sheath is at least about 4 mm thick. Inside the inner sealing sheath 22 the pipe comprises a carcass 21 for reinforcing the pipe against collapse. On the outer side of the inner sealing sheath 22, the flexible pipe comprises a pressure armouring layer 23 of helically wound armouring element(s) of metal or composite material.

Outside the pressure armouring layer 23, the pipe comprises two cross wound tensile armouring layers 27a, 27b wound from elongate armoring elements.

On the outer side of the tensile armouring layers 27a, 27b the pipe comprises an insulating layer 28 which is wound or extruded and optionally perforated, and further the pipe comprises an outermost sealing sheath 29 protecting the armouring layer mechanically and/or against ingress of sea water.

A maintaining pipe 25 has been integrated, e.g. embedded into the insulating layer 28 or placed between the insulating layer 28 and the outermost sealing sheath 29. The maintaining pipe 25 is applied to be substantially parallel to the axis of the pipe. In order to ensure a high flexibility without damaging the maintaining pipe 25, the maintaining pipe 25 is made from a polymer material, preferably with an elasticity which equal to or higher than at least one of the insulating layer 28 and the outermost sealing sheath 29.

In one embodiment the insulating layer 28 is liquid permeable and the annulus is formed between the inner sealing sheath 22 and the outermost sealing sheath 29. The insulating layer 28, the pressure armouring layer 23 and the cross wound tensile armouring layers 27a, 27b are arranged within the annulus. None of the armouring layers 21, 23, 27a, 27b are liquid tight.

In one embodiment the insulating layer 28 is liquid impermeable and the annulus is formed between the insulating layer 28 and the outermost sealing sheath 29. The pressure armouring layer 23 and the cross wound tensile armouring layers 27a, 27b are arranged within the annulus. None of the armouring layers 21, 23, 27a, 27b are liquid tight.

Figure 4:
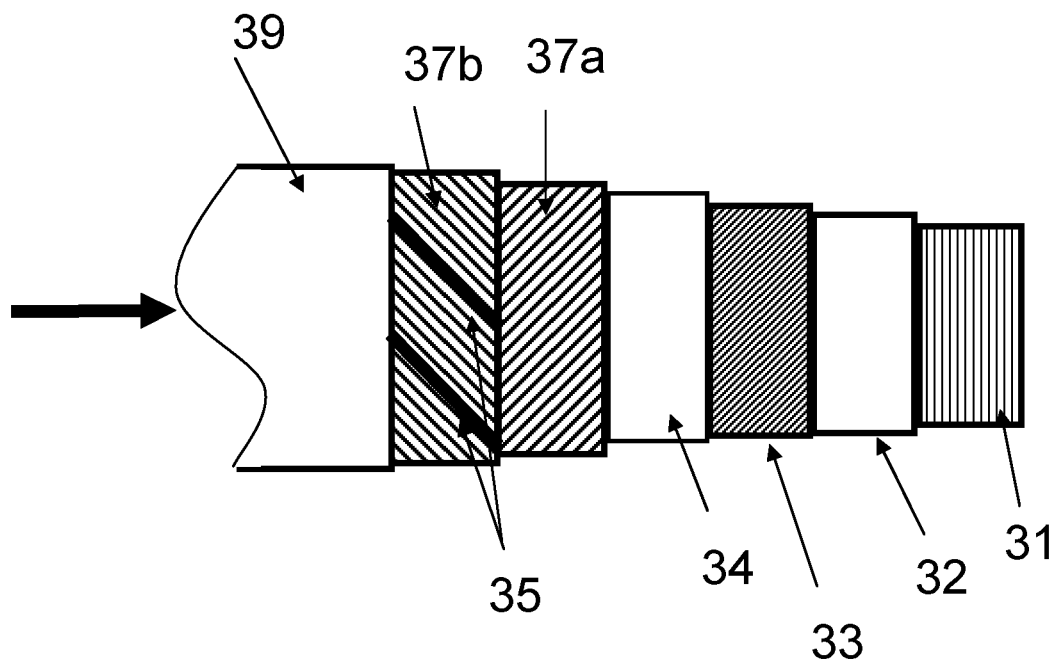
FIG. 4 is a schematic side view of a fourth flexible pipe of the invention.

The flexible pipe shown in FIG. 4 comprises an inner sealing sheath 32, e.g. of cross linked PE or PA. Inside the inner sealing sheath 32 the pipe comprises a carcass 31 for reinforcing the pipe against collapse. On the outer side of the inner sealing sheath 32, the flexible pipe comprises a pressure armouring layer 33 of helically wound armouring element(s) of metal or composite material.

Outside the pressure armouring layer 33, the pipe comprises an intermediate sheath 34. The intermediate sheath 34 is impermeable to liquid and provides the second sealing sheath. Outside the intermediate sheath 34 the pipe comprises two cross wound tensile armouring layers 37a, 37b wound from elongate armoring elements. The two cross wound tensile armouring layers 37a, 37b comprises an innermost tensile armouring layer 37a and an outermost tensile armouring layer 37b. The outermost tensile armouring layer 37b comprises a number of maintaining pipes 35 wound adjacent to elongate armoring elements of the outermost tensile armouring layer 37b. The maintaining pipe 35 may be of material(s) and/or shape as described above.

On the outer side of the tensile armouring layers 37a, 37b the pipe comprises an outermost sealing sheath 39 protecting the tensile armouring layers 37a, 37b mechanically and/or against ingress of sea water.

The annulus is formed between inner sealing sheath 32 and the inner sealing sheath 32 and the intermediate sheath 34. An additional annulus is formed between the intermediate sheath 34 and the outermost sealing sheath 39. The pressure armouring layer is arranged in the annulus. The cross wound tensile armouring layers 37a, 37b are arranged in the additional annulus. None of the armouring layers, 31, 33, 37a, 37b are liquid tight.

Figure 5:
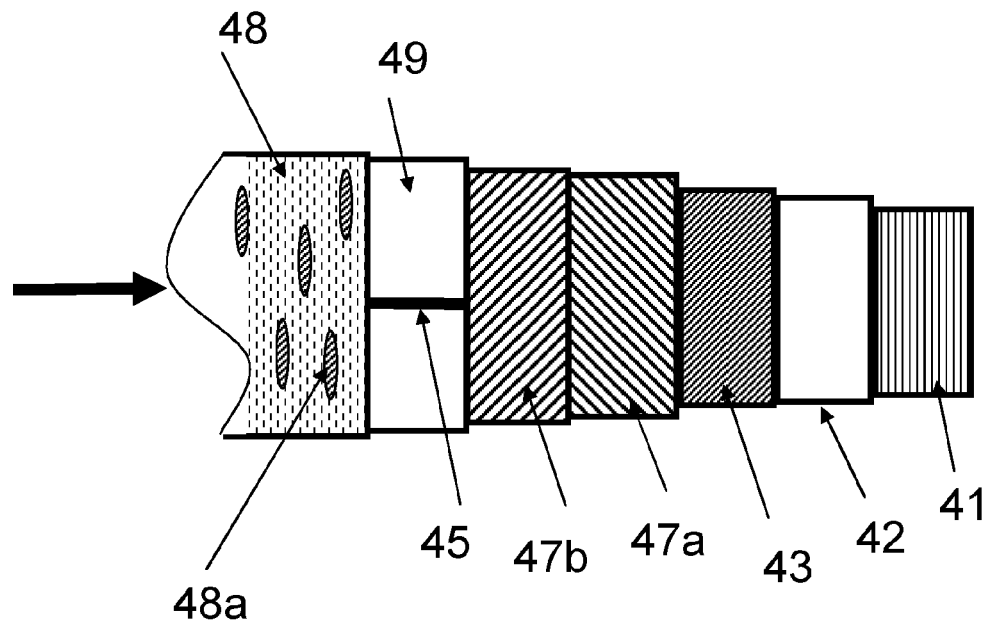
FIG. 5 is a schematic side view of a fifth flexible pipe of the invention.

The flexible pipe shown in FIG. 5 comprises an inner sealing sheath 42, e.g. of cross linked PE or PA. Inside the inner sealing sheath 42 the pipe comprises a carcass 41 for reinforcing the pipe against collapse. On the outer side of the inner sealing sheath 42, the flexible pipe comprises a pressure armouring layer 43 of helically wound armouring element(s) of metal or composite material.

Outside the pressure armouring layer 43, the pipe comprises two cross wound tensile armouring layers 47a, 47b wound from elongate armoring elements.

On the outer side of the tensile armouring layers 47a, 47b the pipe comprises outermost sealing sheath 49 protecting the armouring layer against ingress of sea water.

On the outer side of the outermost sealing sheath 49, the pipe comprises a liquid permeable insulating layer 48. The insulating layer 48 is an extruded, a wound or a folded layer and comprises perforations 48a.

A maintaining pipe 45 has been integrated, e.g. embedded into the outermost sealing sheath 49 or is placed between the outermost sealing sheath 49 and the insulating layer 48. The maintaining pipe 45 is applied to be substantially parallel to the axis of the pipe. In order to ensure a high flexibility without damaging the maintaining pipe 45, the maintaining pipe 45 is made from a polymer material, preferably with an elasticity which equal to or higher than at least one of the insulating layer 48 and the outermost sealing sheath 49.

The annulus is formed between the inner sealing sheath 42 and the outermost sealing sheath 49. The pressure armouring layer 43 and the cross wound tensile armouring layers 47a, 47b are arranged within the annulus. None of the armouring layers 41, 43, 47a, 47b are liquid tight.

Figure 6A:
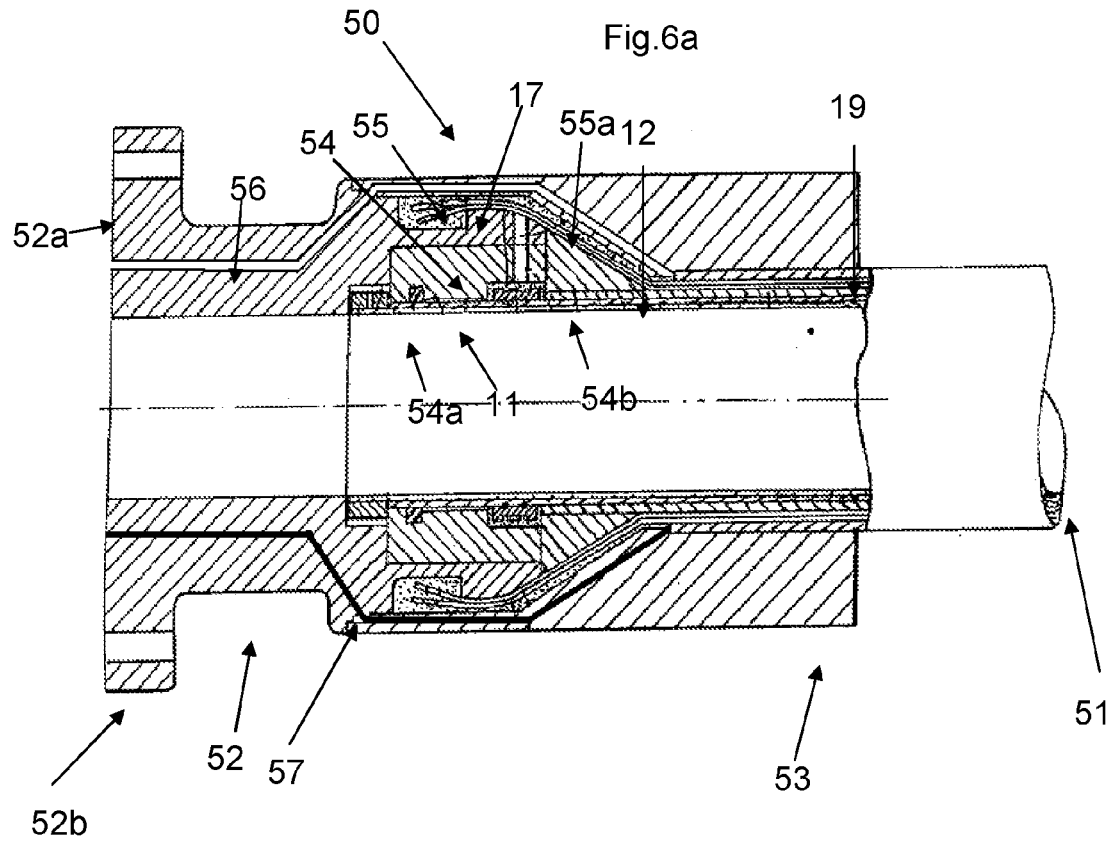
FIG. 6a is a cross-sectional view of a flexible pipe of the invention comprising a first end fitting.

FIG. 6a shows an end fitting 50, terminating an unbonded flexible pipe 51. The pipe 51 has a structure as shown in FIG. 1 or FIG. 2, but without a pressure armouring layer. The pipe 51 comprises an inner sealing sheath 12, a carcass 11 on the inner side of the inner sealing sheath 12, a pair of cross wound tensile armouring layers 17 on the outer side of the inner sealing sheath 12 and an outermost sealing sheath 19 protecting the armouring layer mechanically and against ingress of sea water. One or more maintaining pipes are arranged in the annulus.

The end fitting has a first part 52 with a connection flange 52a with holes 52b for being connected to another flange e. g. to a ship, a platform or another end fitting e.g. by bolt and nut. The end fitting has a second part 53 and a third part 54. The three parts of the end fitting 52, 53, 54 delimit a cavity 55 in which the tensile armouring layers 17 are fixed e.g. using epoxy. The Epoxy or other casting material can for example be introduced through a hole indicated with 55a. The carcass 11 is fastened to the end-fitting 50 by means of a lock nut 54. The inner sealing sheath 12 is fastened to the end-fitting 50 by means of a lock ring 54b which are e.g. secured by a casting material, e.g. epoxy. The outermost sealing sheath 19 is hold fixed between the other layer of the pipe and the first part of the end fitting.

The annulus is connected to a primary end-fitting passage 56 provided in the end-fitting 50 and providing a fluid connection between the annulus and the first part 52 of the end fitting, such that fluid connection can be provided to another unit e. g. to a ship, a platform or another end fitting to which the end fitting 50 is connected.

The maintaining pipe is connected to a secondary end-fitting passage 57 provided in the end-fitting 50 and providing a fluid connection between the maintaining pipe and the first part 52 of the end fitting, such that fluid connection can be provided to another unit e. g. to a ship, a platform or another end fitting to which the end fitting 50 is connected.

A suitable end fitting is e. g. an end-fitting as described in U.S. Pat. No. 6,360,781 which is further provided with at least one first end-fitting passage and at least one second end-fitting passage.

Other well known end fitting in modified form can be used as well, the modification comprises providing the end-fitting with at least one first end-fitting passage and at least one second end-fitting passage.

FIG. 6b shows an embodiment of the invention which is a variation of the embodiment shown in FIG. 6a.

The embodiment of FIG. 6b differs from the embodiment of FIG. 6a in that the annulus is connected to a primary end-fitting passage 56' provided in the end-fitting 50 and providing a fluid connection between the annulus and and out via a side surface of the second part 53 of the end fitting, such that fluid connection can be provided to another unit e. g. to a ship, a platform or another end fitting to which the end fitting 50 is connected.

The maintaining pipe is connected to a secondary end-fitting passage 57' provided in the end-fitting 50 and providing a fluid connection between the maintaining pipe and the first part 52, of the end fitting, such that fluid connection can be provided to another unit e. g. to a ship, a platform or another end fitting to which the end fitting 50 is connected. The end-fitting passage 57' is applied mainly in the cavity 55 in which the tensile armouring layers 17 are fixed using a casting material. By applying the end-fitting passage 57' at least partly in the cavity 55, a very simple construction is applied. In a further variation of the embodiment, also the primary end-fitting passage is provided at least partly in the cavity 55.

FIG. 7 shows an end fitting 60, terminating an unbonded flexible pipe 61. The pipe 61 has a structure as shown in FIG. 1 or FIG. 2, but without a pressure armouring layer. The pipe 61 comprises an inner sealing sheath 12, a carcass 11 on the inner side of the inner sealing sheath 12, a pair of cross wound tensile armouring layers 17 on the outer side of the inner sealing sheath 12 and an outermost sealing sheath 19 protecting the armouring layer mechanically and against ingress of sea water. One or more maintaining pipes are arranged in the annulus.

The end fitting has a first part 62 with a connection flange 62a with holes 62b for being connected to another flange e. g. to a ship, a platform or another end fitting e.g. by bolt and nut. The end fitting has a second part 63 and a third part 64. The three parts of the end fitting 62, 63, 64 delimit a cavity 65 in which the tensile armouring layers 17 are fixed e.g. using epoxy. The carcass 11 is fastened to the end-fitting 60 by means of a lock nut 64. The inner sealing sheath 12 is fastened to the end-fitting 60 by means of a lock ring 64b which are e.g. secured by a casting material, e.g. epoxy. The outermost sealing sheath 19 is hold fixed between the other layer of the pipe and the first part of the end fitting.

The annulus is connected to a primary end-fitting passage 66 which is in the form of a pipe 66a provided in the end-fitting 60 and providing a fluid connection between the annulus and out via a side surface 60a of the second part 63 of the end fitting, such that fluid connection can be provided to another unit e. g. to a ship, a platform or another end fitting to which the end fitting 60 is connected.

The maintaining pipe is connected to a secondary end-fitting passage 67 which is in the form of a pipe 67a provided in the end-fitting 60 and providing a fluid connection between the maintaining pipe and out via a side surface 60a of the first part 63 of the end fitting, such that fluid connection can be provided to another unit e. g. to a ship, a platform or another end fitting to which the end fitting 60 is connected.

FIG. 8 shows an end fitting 70, terminating an unbonded flexible pipe 71. The pipe 71 has a structure as shown in FIG. 5, but without a pressure armouring layer. The pipe 71 comprises an inner sealing sheath 42, a carcass 41 on the inner side of the inner sealing sheath 42, a pair of cross wound tensile armouring layers 47 on the outer side of the inner sealing sheath 42 and an outermost sealing sheath 49 protecting the armouring layer against ingress of sea water. Outside the outermost sealing sheath 49 a liquid permeable insulating layer 48 is provided. A maintaining pipe 45 has been integrated, e.g. embedded into the outermost sealing sheath 49 or is placed between the outermost sealing sheath 49 and the insulating layer 48.

The end fitting has a first part 72 with a connection flange 72a with holes 72b for being connected to another flange e. g. to a ship, a platform or another end fitting e.g. by bolt and nut. The end fitting has a second part 73 and a third part 74. The three parts of the end fitting 72, 73, 74 delimit a cavity 75 in which the tensile armouring layers 47 are fixed e.g. using epoxy. The carcass 41 is fastened to the end-fitting 70 by means of a lock nut 74. The inner sealing sheath 42 is fastened to the end-fitting 70 by means of a lock ring 74b which are e.g. secured by a casting material, e.g. epoxy. The outermost sealing sheath 49 is hold fixed between the other layer of the pipe and the first part of the end fitting.

The annulus is connected to a primary end-fitting passage 76 which is in the form of a pipe 76a provided in the end-fitting 70 and providing a fluid connection between the annulus and out via a side surface 70a of the second part 73 of the end fitting, such that fluid connection can be provided to another unit e. g. to a ship, a platform or another end fitting to which the end fitting 70 is connected.

The maintaining pipe 45 is passing directly out from the insolating layer 48, which is terminating outside the end fitting 70. The fluid connection from the maintaining pipe 45 can be provided to another unit e. g. to a ship, a platform or another end fitting to which the end fitting 70 is connected.

FIG. 9 shows an end fitting 80, terminating an unbonded flexible pipe 81. The pipe 81 has a structure as shown in FIG. 1 or FIG. 2, but without a pressure armouring layer. The pipe 81 comprises an inner sealing sheath 12, a carcass 11 on the inner side of the inner sealing sheath 12, a pair of cross wound tensile armouring layers 17 on the outer side of the inner sealing sheath 12 and an outermost sealing sheath 19 protecting the armouring layer mechanically and against ingress of sea water. One or more maintaining pipes are arranged in the annulus.

The end fitting has a first part 82 with a connection flange 82a with holes 82b for being connected to another flange e. g. to a ship, a platform or another end fitting e.g. by bolt and nut. The end fitting has a second part 83 and a third part 84. The three parts of the end fitting 82, 83, 84 delimit a cavity 85 in which the tensile armouring layers 17 are fixed e.g. using epoxy. The carcass 11 is fastened to the end-fitting 80 by means of a lock nut 64. The inner sealing sheath 12 is fastened to the end-fitting 80 by means of a lock ring 84b which are e.g. secured by a casting material, e.g. epoxy. The outermost sealing sheath 19 is hold fixed between the other layer of the pipe and the first part of the end fitting.

The end fitting comprises a recess 88 in side surface 60a of the second part 83 of the end fitting. In this recess 88 the end fitting comprises a connecting unit 89.

The annulus is connected to a primary end-fitting passage 86 which primary end-fitting passage 86 is in fluid connection with the connecting unit 89. The maintaining pipe is connected to a secondary end-fitting passage 87 which secondary end-fitting passage 87 is in fluid connection with the connecting unit 89. Thereby the primary end-fitting passage 86 and the secondary end-fitting passage 87 are in fluid connection with each other. The connecting unit 89 may be a simple chamber and it may comprise a valve, such as an on-off valve.

FIGS. 10a and 10b show an end fitting 90 terminating a pipe 91, e.g. a termination of a pipe as shown in FIG. 6. The end fitting 90 comprises a flange 92 with a front side 92a and with holes 92b for being connected to another flange e. g. to a ship, a platform or another end fitting e.g. by bolt and nut.

The end fitting 90 comprises primary end-fitting passages 96 leading from the not shown annulus to the front side 92a of the end fitting 90, and secondary end-fitting passages 97 leading from not shown maintaining pipes to the front side 92a of the end fitting 90

Figure 11:
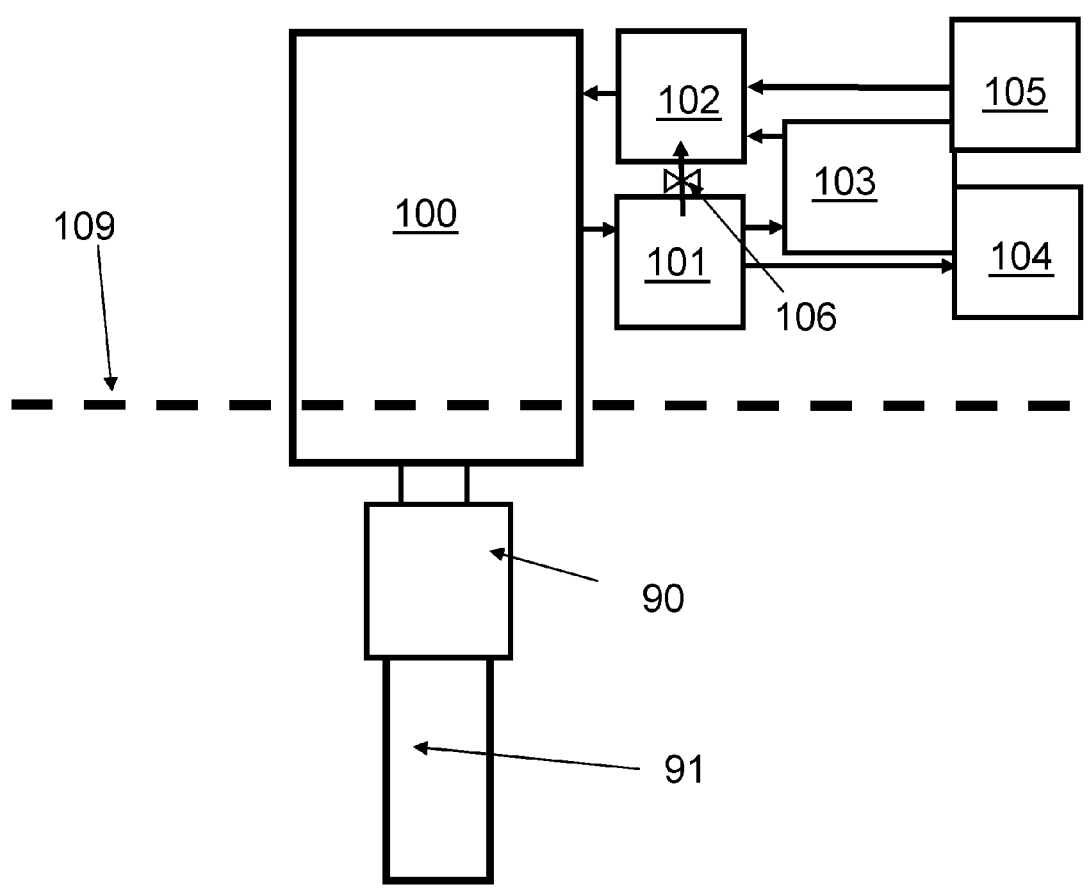
FIG. 11 is a schematic side view of an offshore installation of the invention.

FIG. 11 shows an offshore installation partly installed under water indicated by the water line 109. The offshore installation comprises a riser pipe 91 comprising an end fitting 90 which is partly above water level 109. The end fitting 90 is connected to a sea surface unit 100 such as a floating unit e.g. a ship or a platform.

In a variation thereof the offshore installation is installed such that the end-fitting is fully above water level.

The unbonded flexible pipe is as described above e.g. as shown in the figures. The not shown primary maintaining passage(s) are in fluid connection with a maintaining fluid collecting container 101 and the not shown secondary maintaining passage(s) are in fluid connection with a maintaining fluid supply container 102 from where the maintaining fluid is fed to the input end which is the first end of the not shown secondary maintaining passage. The maintaining fluid passes through the pathway and out via the first end of the primary maintaining passage from where it is lead to the maintaining fluid collecting container 101. From the maintaining fluid collecting container 101 the maintaining fluid may be lead directly to the maintaining fluid supply container 102, however it is preferred that at least a part of the maintaining fluid is led from the fluid collecting container 101 to a regeneration unit 103, from where it can—after regeneration—be led into the maintaining fluid supply container 102 for reuse. A part of the maintaining fluid may be withdrawn from the maintaining fluid collecting container 101 to a waste container 104. Further more additional and/or fresh maintaining fluid can be fed to the fluid supply container 102 from a fresh maintaining fluid container 105. The system comprises various valves 106 and other well known elements for regulating the flow of the maintaining fluid. A pump is preferably arranged in the fluid supply container 102 and/or in the fluid collecting container 101.

Example 1

A 900 m long riser pipe is produced. The riser pipe has the following layers from inside and out:
  A carcass of duplex steel
  An inner sealing sheath of Polyamide (PA), with a thickness of 8 mm.
  2 cross wound tensile armour layers of duplex steel An outermost sealing sheath of polyethylene (PE), with a thickness of 8.5 mm.

One of the tensile armouring elements of the outermost tensile armouring layer is replaced with a maintaining pipe.

The pipe is terminated with a first (uppermost) end-fitting and a second (lower most) end-fitting.

In the second end-fitting the maintaining pipe is connected to the annulus to provide a pathway from the upper end of the riser via the fluidic connection in the second end-fitting and to the upper end of the riser.

The riser is installed at a production site for transporting crude oil from a well to a sea-surface installation (e.g. a platform).

The sum of $CO_2$, $CH_4$, $H_2S$ and $H_2O$ entering the annulus from the bore is estimated to be $3.28 \cdot 10$-7 mol/m/s, based on the known permeability of the material of the inner sealing sheath. The temperature around the tensile wires in annulus will be about 44° C.

Using the ideal gas law, and assuming an annulus pressure of 1 atm, the flow of gases from bore to annulus for a 900 m Riser Top section can be calculated as follows:

$$\frac{V}{time} = \frac{\frac{n}{time}RT}{p} = \frac{3.28 \cdot 10^{-7} \frac{mol}{ms} \cdot 900 \, m \cdot 8.314 \frac{J}{Kmol} 317.15 \, K}{100000 \frac{N}{m^2}} =$$

$$7.78 \cdot 10^{-4} \frac{m^3}{s} = 28.0 \frac{liter}{hour}$$

The amount of ventilation needed to keep the annulus dry can be calculated using Arden Buck equation (Equation 1) and the ideal gas law (equation 2):

$$p_w = 6.1121 \exp\left(\left(18.678 - \frac{t}{234.5}\right)\frac{t}{257.14+t}\right) \quad \text{(Equation 1)}$$

where:
$p_w$ is the saturation vapor pressure in hPa
exp is the natural (i.e. base e) exponential function
t is the air temperature in degrees Celsius.

The ideal gas law, modified to consider flow:

$$p \cdot V = n \cdot R \cdot T \Rightarrow p_w \cdot 100 \cdot \frac{V}{time} = \frac{n_{H_2O}}{time} \cdot R \cdot T \quad \text{(Equation 2)}$$

where
$nH_2O$/time is the flow of water/vapor entering annulus from bore and sea
V/time is the flow of dry air ventilating annulus
T is the air temperature in Kelvin
Assuming the following:
The gases are behaving according to the above equations 1 and 2
The ventilation gas is completely dry when it enters annulus
The ventilation gas is saturated with vapor when exiting annulus
The ventilation gas flow necessary to remove all water entering the annulus, can now be calculated as follows:

$$\frac{V}{time} = \frac{\frac{n_{H_2O}}{time} \cdot R \cdot T}{100 \cdot 6.1121 \cdot e^{\left(\left(18.678 - \frac{t}{234.5}\right)\frac{t}{257.14+t}\right)}} \quad \text{(Equation 3)}$$

The conditions in the riser top section annulus are as follows:

$n_{H_2O}$/time=19.99·10$^{-6}$ mol/s t=44° C.

The required ventilation volume is according to equation 3:

V/time=5.792·10$^{-6}$ m$^3$/s=20.85 liter/hour

By flushing the annulus via the pathway provided by the maintaining pipe and the annulus with 20.85 liter dry air per hour, the annulus can be kept dry. The maintaining pipe is therefore selected to have a cross-sectional area of its flushing bore sufficient to the required flow.

Example 2

The installed pipe of example 1 is subjected to a constant flushing of the annulus via the pathway provided by the maintaining pipe and the annulus with 20.85 liter dry air per hour.

A similar pipe, but without the maintaining pipe and without flushing of annulus, is installed and set to a similar operation as the pipe of example 1.

Calculation shows that the fatigue damage after 20 years of the riser of example 1 with a dry annulus is much lower that the fatigue damage after 20 years of the riser without a maintaining pipe and therefore with a wet annulus.

What is claimed is:

1. An unbonded flexible pipe for sub sea transportation of fluids, the pipe has a length and comprises a tubular inner sealing sheath defining a bore and an axis of the pipe and forming a barrier against fluids transported in the bore, the pipe comprises at least one pipe length section comprising a second sealing sheath surrounding the inner sealing sheath and forming an annulus between the inner sealing sheath and the second sealing sheath, the annulus provides a primary maintaining passage along the length of the pipe length section with a first and a second end, the pipe comprises at least one secondary maintaining passage along the length of the pipe with a first and a second end, the secondary maintaining passage is arranged with an axial distance which is larger than the axial distance of the inner sealing sheath, wherein the first end of one of the primary and the secondary maintaining passages is arranged as an input end for a maintaining fluid and the first end of the other of the primary and the secondary maintaining passages is arranged as an outflow end for the maintaining fluid, and the primary and the secondary maintaining passages are in fluidic connection with each other at their second ends to provide a pathway for the maintaining fluid.

2. The unbonded flexible pipe as claimed in claim 1, wherein the pipe in at least the pipe length section comprises an outermost sealing sheath, the secondary maintaining passage is arranged inside the outermost sealing sheath.

3. The unbonded flexible pipe as claimed in claim 1, wherein the pipe in at least the pipe length section comprises an outermost sealing sheath providing the second sealing sheath, the pipe in at least the pipe length section comprises at least two armouring layers arranged in the annulus.

4. The unbonded flexible pipe as claimed in claim 1, wherein the pipe in at least the pipe length section comprises an intermediate sealing sheath providing the second sealing sheath, the pipe in at least the pipe length section comprises at least one armouring layer arranged in the annulus.

5. The unbonded flexible pipe as claimed in claim 4, wherein the pipe in at least the pipe length section comprises a pressure armouring layer in the annulus.

6. The unbonded flexible pipe as claimed in claim 4, wherein the pipe in at least the pipe length section comprises a pressure armouring layer and a tensile armour layer in the annulus, the tensile armouring layer is provided by a plurality of helically wound armouring elements, optionally wound with an angle of about 60 degrees or less.

7. The unbonded flexible pipe as claimed in claim 4, wherein the pipe in at least the pipe length section comprises a third sealing sheath surrounding the second sealing sheath and forming an additional annulus between the second sealing sheath and the third sealing sheath.

8. An unbonded flexible pipe as claimed in claim 7, wherein the pipe in at least the pipe length section comprises at least one tensile armour layer in the additional annulus, the tensile armouring layer is provided by a plurality of helically wound armouring elements, optionally wound with an angle of about 60 degrees or less.

9. The unbonded flexible pipe as claimed in claim 1, wherein the insulating layer is an extruded layer, the pipe in at least the pipe length section comprises the maintaining pipe between the insulating layer and an underlying layer, the extruded insulating layer conforms to the shape of the maintaining pipe to at least partly embed the maintaining pipe.

10. The unbonded flexible pipe as claimed in claim 9, wherein the pipe in at least the pipe length section comprises the maintaining pipe between the insulating layer and an underlying layer, the underlying layer is selected from an outermost sealing sheath, an armouring layer, an intermediate sealing sheath, and the inner sealing sheath.

11. The unbonded flexible pipe as claimed in claim 1, wherein the pipe in at least the pipe length section comprises an insulating layer in form of a wound layer, the secondary maintaining passage is at least partly embedded in the insulation layer.

12. The unbonded flexible pipe as claimed in claim 11, wherein the pipe in at least the pipe length section comprises the maintaining pipe between the insulating layer and an underlying layer.

13. The unbonded flexible pipe as claimed in claim 1, wherein the secondary maintaining passage in at least the pipe length section is arranged with an axial distance which is larger than the axial distance of the first maintaining passage.

14. The unbonded flexible pipe as claimed in claim 1, wherein the pipe in at least the pipe length section comprises an outermost sealing sheath and the secondary maintaining passage is arranged with an axial distance which is larger than the axial distance of the outermost sealing sheath, the secondary maintaining passage is provided by a maintaining pipe.

15. The unbonded flexible pipe as claimed in claim 1, wherein the pipe in at least the pipe length section comprises an outermost sealing sheath and the secondary maintaining passage is arranged fully or partly outside the outermost sealing sheath.

16. The unbonded flexible pipe as claimed in claim 1, wherein the secondary maintaining passage in at least the pipe length section of the pipe is provided by a maintaining pipe.

17. The unbonded flexible pipe as claimed in claim 16, wherein the maintaining pipe is made of one or more materials comprising at least one of metals; polymers and combinations of metal and polymer.

18. The unbonded flexible pipe as claimed in claim 1, wherein the secondary maintaining passage in at least the pipe length section of the pipe is provided by a maintaining pipe and at least a length of the maintaining pipe is located outside an outermost layer of the pipe.

19. The unbonded flexible pipe as claimed in claim 1, wherein the secondary maintaining passage is substantially identical along the length of the pipe length section.

20. The unbonded flexible pipe as claimed in claim 1, wherein the secondary maintaining passage varies along the length of the pipe length section.

21. The unbonded flexible pipe as claimed in claim 1, wherein the secondary maintaining passage has a cross-sectional area of at least about 3 $mm^2$.

22. The unbonded flexible pipe as claimed in claim 1, wherein the secondary maintaining passage per Km of the pipe length section has a cross-sectional area of at least about 10 $mm^2$.

23. The unbonded flexible pipe as claimed in claim 1, wherein the secondary maintaining passage has a cross-sectional area between from about 3 $mm^2$ to about $200^2$ mm.

24. The unbonded flexible pipe as claimed in claim 1, wherein the pipe length section comprises an end-fitting coupled to and terminating an end of said pipe length section, the end fitting comprises a primary end-fitting passage in fluidic connection with the primary maintaining passage and the end fitting comprises a secondary end-fitting passage in fluidic connection with the secondary maintaining passage.

25. The unbonded flexible pipe as claimed in claim 24, wherein the pipe comprises at least two interconnected pipe length sections each comprising an end-fitting coupled to and terminating an end of said respective pipe length sections, the end-fittings provide at least a part of a connecting assembly interconnecting the pipe length sections, the end fittings each comprise a primary end-fitting passage, the primary end-fitting passages are in fluidic connection with each other and the end fittings each comprise a secondary end-fitting passage, the secondary end-fitting passages of the end-fittings are in fluidic connection with each other.

26. The unbonded flexible pipe as claimed in claim 1, wherein the primary and the secondary maintaining passages are in fluidic connection with each other at their second ends to provide a pathway for the maintaining fluid from the input end to the outflow end.

27. The unbonded flexible pipe as claimed in claim 1, wherein the primary and the secondary maintaining passages are in fluidic connection with each other, the pipe length section comprises an end-fitting coupled to and terminating an end of said pipe length section, the end fitting comprises a primary end-fitting passage in fluidic connection with the primary maintaining passage, and a secondary end-fitting passage in fluidic connection with the secondary maintaining passage, the fluidic connection between the primary maintaining passage and the secondary maintaining passage is provided in the end-fitting.

28. The unbonded flexible pipe as claimed in claim 1, wherein the pipe comprises at least two interconnected pipe length sections comprising interconnected primary maintaining passages and interconnected secondary maintaining passages, the primary and the secondary maintaining passages of the interconnected pipe length sections are in fluidic connection with each other, at least one of the pipe length section comprises an end-fitting coupled to and terminating an end of said pipe length section, the end-fitting comprises a primary end-fitting passage in fluidic connection with the interconnected primary maintaining passage and a secondary end-fitting passage in fluidic connection with the interconnected secondary maintaining passages, the fluidic connection between the primary maintaining passage and the secondary maintaining passage of the pipe length sections is provided in the end-fitting.

29. The unbonded flexible pipe as claimed in claim 1, wherein the first end of the secondary maintaining passage is arranged as the input end for the maintaining fluid and the first end of the primary maintaining passages is arranged as the outflow end, optionally a pump is provided to pump the maintaining fluid from the input end, through the pathway and to exit at the outflow end.

30. The unbonded flexible pipe as claimed in claim 1, wherein the first end of the primary maintaining passage is arranged as the input end for the maintaining fluid and the first end of the secondary maintaining passages is arranged as the outflow end.

31. The unbonded flexible pipe as claimed in claim 1, wherein the unbonded flexible pipe is a riser and at least one of the first ends of one of the primary and the secondary maintaining passages is adapted to be open to be in fluidic communication with the air above sea surface.

32. An offshore installation comprising an unbonded flexible pipe as claimed in claim 1, the unbonded flexible pipe being at least partly installed under water.

33. The offshore installation as claimed in claim 32, wherein the offshore installation further comprises a pump for pumping the maintaining fluid.

34. The offshore installation as claimed in claim 32, wherein the offshore installation further comprises one or more of a regeneration unit for regenerating maintaining fluid, a maintaining fluid supply, and/or a maintaining fluid waist collector.

35. The offshore installation as claimed in claim 32, wherein the offshore installation further comprises one or more valves to regulate the flow of the maintaining fluid.

36. The offshore installation as claimed in claim 32, wherein the offshore installation further comprises one or more measuring units for determining at least one parameter of the maintaining fluid and/or the pathway.

37. The offshore installation as claimed in claim 32, wherein the unbonded flexible pipe is a riser, at least a part of the riser extends above water level, and at least one of the first ends of one of the primary and the secondary maintaining passages is open to the air above water level.

38. The offshore installation as claimed in claim 37, one or both of the first ends of the primary and the secondary maintaining passages are open to the air above water level.

39. A method of maintaining an unbonded flexible pipe of an offshore installation as claimed in claim 1, the method comprises maintaining the annulus clean and/or dry by flushing the annulus with a maintaining fluid.

40. The method of maintaining an unbonded flexible pipe of an offshore installation as claimed in claim 39, wherein the maintaining fluid is flowed in the pathway for the maintaining fluid.

41. A method of maintaining an unbonded flexible pipe of an offshore installation as claimed in claim 39, wherein the maintaining fluid is or comprises liquid.

42. The method of maintaining an unbonded flexible pipe of an offshore installation as claimed in claim 39, wherein the maintaining fluid is gas, the gas is or comprises a drying gas selected from nitrogen (N2) and/or argon (Ag); air and/or methane (CH4).

43. A method of maintaining an unbonded flexible pipe of an offshore installation as claimed in claim 42, wherein the flow is driven by convection.

44. The unbonded flexible pipe as claimed in claim 1, further comprising an insulation layer, wherein the first end of one of the primary and the secondary maintaining passages is at least partly embedded in the insulation layer.

\* \* \* \* \*